United States Patent
Oh et al.

(10) Patent No.: US 11,835,832 B2
(45) Date of Patent: Dec. 5, 2023

(54) FLEXIBLE ELECTROCHROMIC DEVICE

(71) Applicant: SKC CO., LTD., Gyeonggi-do (KR)

(72) Inventors: Seung Bae Oh, Gyeonggi-do (KR); Yong Sang La, Gyeonggi-do (KR); Seong Hwan Lee, Gyeonggi-do (KR); Jongmin Shim, Gyeonggi-do (KR); Il Hwan Yoo, Gyeonggi-do (KR); Byeong Uk Ahn, Gyeonggi-do (KR)

(73) Assignee: SKC Co., LTD., Gyeonggi-do (KR)

( * ) Notice: Subject to any disclaimer, the term of this patent is extended or adjusted under 35 U.S.C. 154(b) by 100 days.

(21) Appl. No.: 17/342,651

(22) Filed: Jun. 9, 2021

(65) Prior Publication Data
US 2021/0389638 A1 Dec. 16, 2021

(30) Foreign Application Priority Data

Jun. 10, 2020 (KR) .................. 10-2020-0070599
Sep. 29, 2020 (KR) .................. 10-2020-0126809

(51) Int. Cl.
*G02F 1/153* (2006.01)
*G02F 1/1516* (2019.01)
*E06B 9/24* (2006.01)
*G02F 1/155* (2006.01)

(52) U.S. Cl.
CPC ........ *G02F 1/1533* (2013.01); *G02F 1/15165* (2019.01); *E06B 2009/2464* (2013.01); *G02F 1/155* (2013.01)

(58) Field of Classification Search
CPC .... G02F 1/1533; G02F 1/15165; G02F 1/155; G02F 1/153; E06B 2009/2464; G09F 9/301
See application file for complete search history.

(56) References Cited

U.S. PATENT DOCUMENTS

2011/0006272 A1* 1/2011 Tieke .................. C09K 9/02
252/583

FOREIGN PATENT DOCUMENTS

| KR | 10-2017-0101702 A | 9/2017 |
| KR | 10-1862200 B1 | 7/2018 |
| KR | 10-2018-0101702 A | 9/2018 |
| KR | 10-2019-0026208 A | 3/2019 |
| KR | 10-2021189 B1 | 9/2019 |

OTHER PUBLICATIONS

Rakibuddin et al. "Sol-gel fabrication of NiO and NiO/WO3 based electrochromic device on ITO and flexible substrate" Ceramics International, vol. 46, pp. 8631-8639 (Year: 2020).*

(Continued)

*Primary Examiner* — George G. King
(74) *Attorney, Agent, or Firm* — IP & T GROUP LLP

(57) ABSTRACT

The embodiments relate to an electrochromic device having flexibility while achieving an excellent light transmission variable function based on the electrochromic principle. The electrochromic device comprises a light transmission variable structure interposed between a first base layer and a second base layer, wherein the light transmission variable structure comprises a first chromic layer and a second chromic layer, and the value of $\Delta TTd_{24}$ as defined in Equation (1) is 3% or less.

8 Claims, 4 Drawing Sheets

(56) References Cited

OTHER PUBLICATIONS

Tang et al. "Large-area flexible monolithic ITO/WO3/Nb2O5/NiVO/ITO electrochromic devices prepared by using magnetron sputter deposition" Optical Materials, vol. 55, pp. 83-89 (Year: 2016).*
BreezeMaxWeb "What is Laminating Film Made Out of?" https://lamin-8.ca/what-is-laminating-film-made-out-of/ (Year: 2014).*
Stallings "Laminated Printing: Choosing a Laminate Thickness to Fit Your Project" https://www.formaxprinting.com/blog/2014/06/laminated-printing-choosing-a-laminate-thickness-to-fit-your-project/ (Year: 2014).*
Zhou et al. "Polyaniline films with modified nanostructure for bifunctional flexible multicolor electrochromic and supercapacitor applications" Chemical Engineering Journal, vol. 345 pp. 290-292 (Year: 2018).*
Mecerreyes et al. "A simplified all-polymer flexible electrochromic device" Electrochimica Acta, vol. 49, pp. 3555-3559 (Year: 2004).*
Office Action issued by the Korean Patent Office dated Jul. 8, 2021.
Office Action issued by the Korean Intellectual Property Office dated Oct. 25, 2021.

* cited by examiner

[Fig. 1]
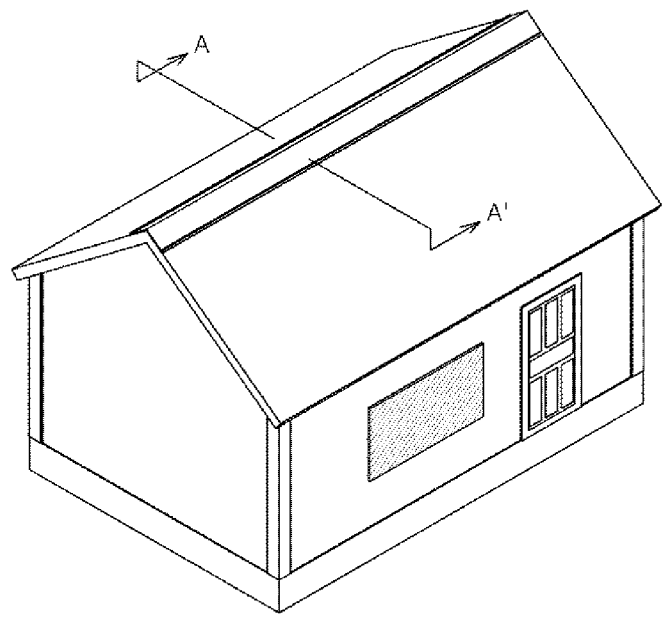
[Fig. 2]
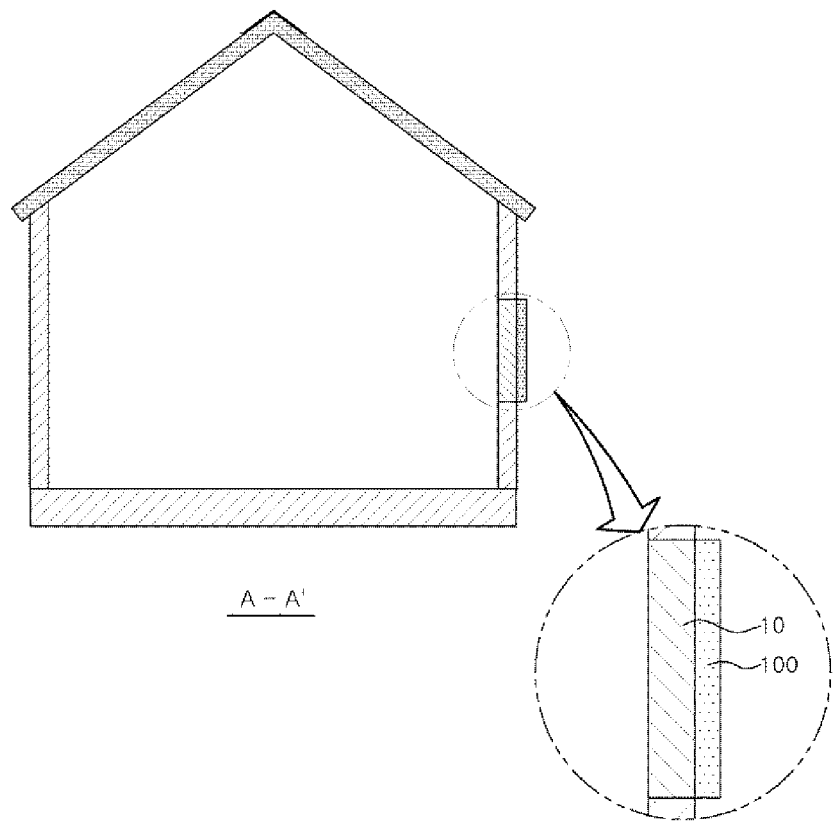
A − A'

[Fig. 3]
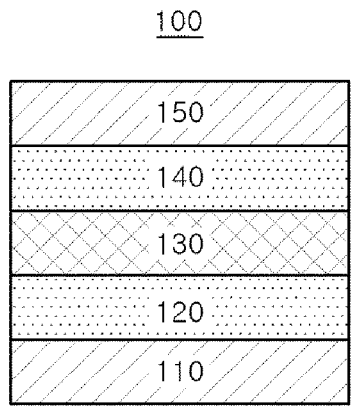
[Fig. 4]
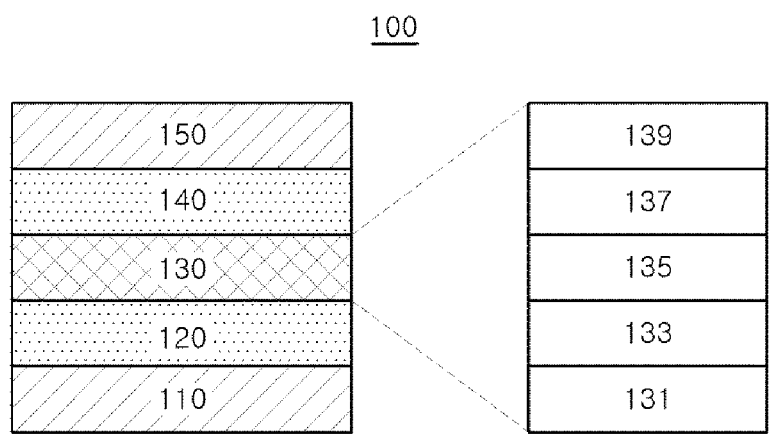
[Fig. 5]
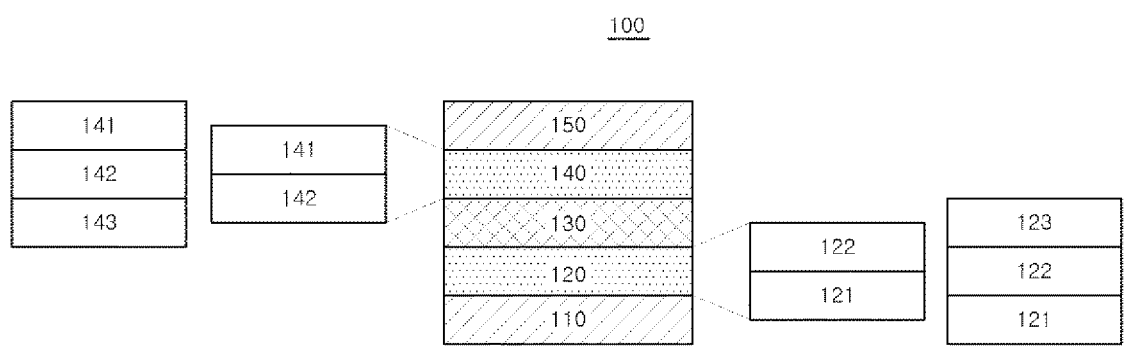

[Fig. 6]
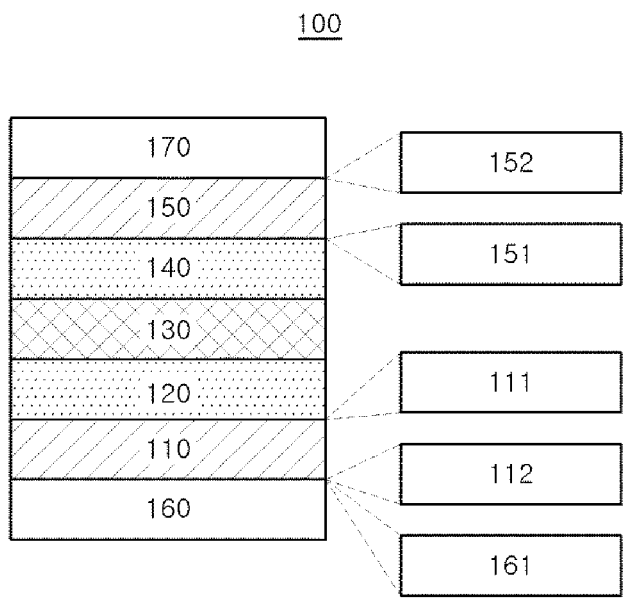
[Fig. 7]
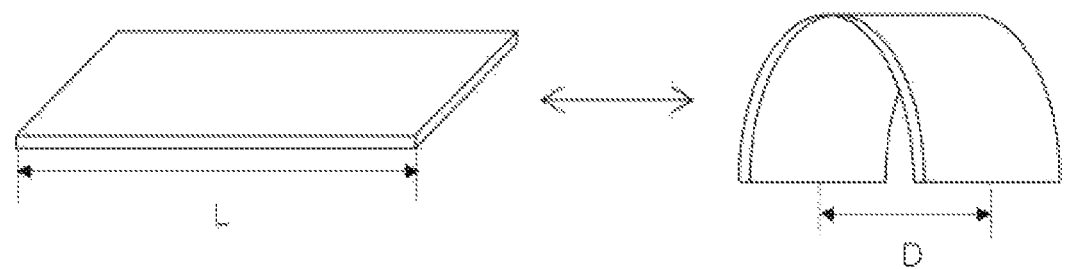
[Fig. 8]
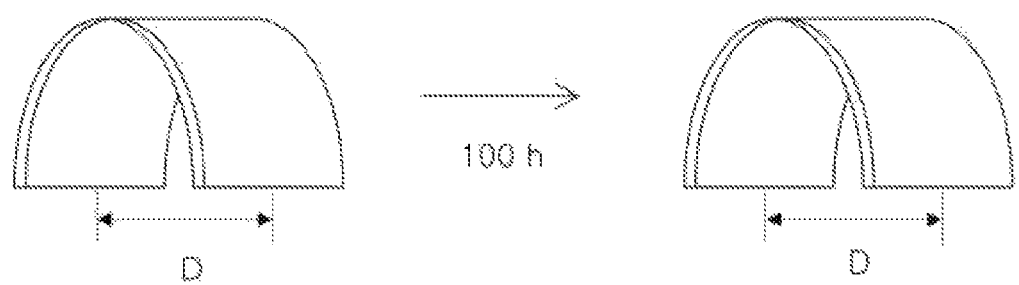

[Fig. 9]
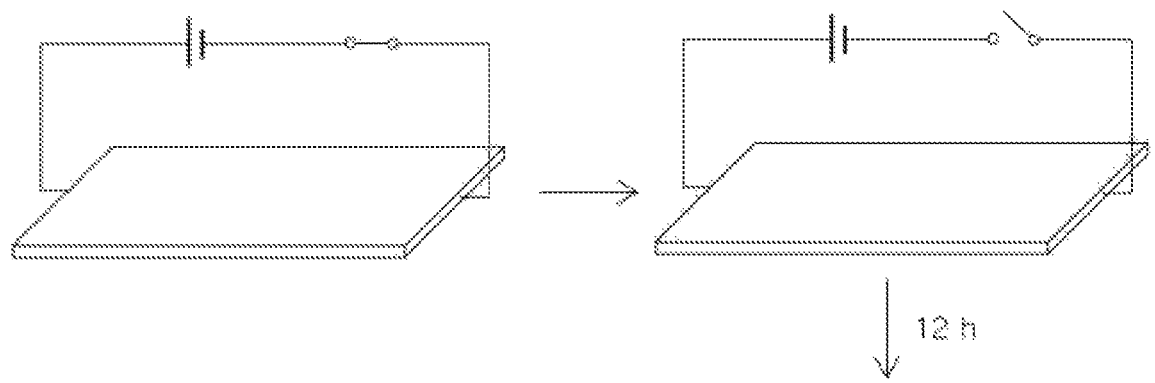
[Fig. 10]
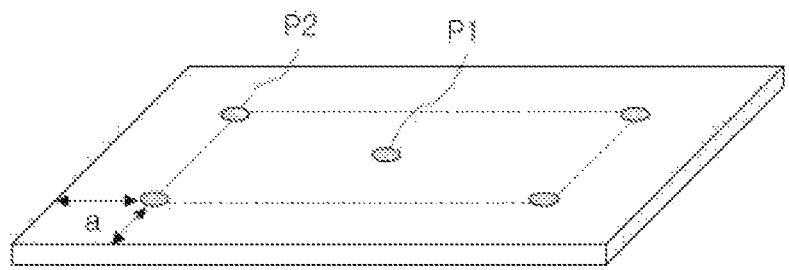

FLEXIBLE ELECTROCHROMIC DEVICE

The present application claims priority of Korean patent application number 10-2020-0070599 filed on Jun. 10, 2020 and Korean patent application number 10-2020-0126809 filed on Sep. 29, 2020. The disclosure of each of the foregoing applications is incorporated herein by reference in its entirety.

TECHNICAL FIELD

Embodiments relate to an electrochromic device having flexibility while achieving an excellent light transmission variable function based on the electrochromic principle.

BACKGROUND ART

In recent years, as interest in environmental protection has increased, interest in technologies that enhance energy efficiency is also increasing. As an example, research and development on technologies such as smart windows and energy harvesting are being actively conducted. A smart window among them refers to an active control technology that adjusts the degree of transmission of light coming from the outside to enhance energy efficiency and to provide a pleasant environment to the users. It is a fundamental technology that can be commonly applied to various industrial fields. A smart window is based on electrochromism. Electrochromism is a phenomenon in which an electrochemical oxidation or reduction reaction takes place as electric power is applied, and an inherent color or optical properties such as light transmittance of an electrochromically active material are changed accordingly.

Currently, a glass-type smart window is generally used in which an electrochromic device is applied between several sheets of glass. However, its manufacturing process is complicated, and the product price is very high since the size of the product is to be tailored to the size of a window to be constructed, so that there are difficulties in commercializing it. In addition, there are also problems in that if a silicone finish is applied, moisture may penetrate, resulting in a risk of a short circuit, that it occupies a lot of storage space during logistics transportation, and that it is fragile to external impact and thus dangerous due to the nature of the material.

Thus, there has been a continuous demand for research on a smart window that is capable of solving the above problems and achieving an excellent light transmission variable function.

PRIOR ART DOCUMENT (Patent Document 1) Korean Patent No. 1862200 (May 23, 2018)

DISCLOSURE OF INVENTION

Technical Problem

The embodiments aim to provide an electrochromic device having flexibility while achieving an excellent light transmission variable function based on the electrochromic principle.

Solution to Problem

According to an embodiment, there is provided an electrochromic device, which comprises a light transmission variable structure interposed between a first base layer and a second base layer, wherein the light transmission variable structure comprises a first chromic layer and a second chromic layer, and the value of $\Delta TTd_{24}$ as defined in the following Equation (1) is 3% or less.

$$\Delta TTd_{24}(\%) = |TTd_{24} - TTd_0| \tag{1}$$

In Equation (1), $TTd_0$ is the average transmittance (%) of visible light in the maximum decolored state when electric power is applied after the electrochromic device is deformed to have a radius of curvature of 17R (17 mm), and $TTd_{24}$ is the average transmittance (%) of visible light measured after $TTd_0$ is measured, the electric power is turned off, and the electrochromic device deformed to have a radius of curvature of 17R (17 mm) is maintained for 24 hours.

According to another embodiment, there is provided an electrochromic device, which comprises a light transmission variable structure interposed between a first base layer and a second base layer, wherein the light transmission variable structure comprises a first chromic layer capable of adjusting coloration and decoloration according to the application of electric power, and when the electrochromic device, based on a specimen having a size of 300 mm in length and 200 mm in width, is subjected to a repeated bending test in which the specimen is bent such that the distance between both ends in the longitudinal direction is 75 mm and then unbent to the original state, the first change ($\Delta TT\_B30$) in transmittance as defined in the following Equation (i) is within 1.5%.

$$\Delta TT\_B30(\%) = |TT\_B30 - TT\_0| \tag{i}$$

In Equation (i), $TT\_B30$ is the average transmittance (%) of visible light of the electrochromic device measured in the maximum decolored state after the bending test is repeated 30 times, and $TT\_0$ is the average transmittance (%) of visible light of the electrochromic device measured in the maximum decolored state before the bending test.

Advantageous Effects of Invention

The electrochromic device according to the embodiment achieves an excellent light transmission variable function based on the electrochromic principle while securing characteristics of flexibility. In particular, the electrochromic device can be deformed to have a small radius of curvature. It is possible to achieve an excellent light transmission variable function not only in the deformed state, but also after the deformed state is maintained for several hours. In addition, the electrochromic device has little change in transmittance as compared with the initial stage, and the transmittance operation function can be maintained as it is, even when the electrochromic device is subjected to repeated bending, when it is maintained in the bent state for a long period of time, or when the power is cut off for a long period of time.

Accordingly, the electrochromic device can be applied to a curved window without a deterioration in performance. It can be applied to curved parts or large moving parts in such fields as electronic devices, automobiles, and architecture. In addition, the electrochromic device can be wound in a roll shape by virtue of its flexibility, so that it can provide convenience in the manufacturing process, transportation, and installation. It has excellent workability as it can be easily cut and attached to fit various window sizes.

BRIEF DESCRIPTION OF DRAWINGS

FIG. 1 is a perspective view conceptually showing a window to which an electrochromic device according to an embodiment is applied.

FIG. 2 is a cross-sectional view taken along line A-A' in FIG. 1 and an enlarged view thereof.

FIG. 3 schematically shows a cross-section of an electrochromic device according to an embodiment.

FIG. 4 schematically shows a cross-section of an electrochromic device and a light transmission variable structure according to an embodiment.

FIG. 5 schematically shows a cross-section of an electrochromic device and a barrier layer according to an embodiment.

FIG. 6 schematically shows a cross-section of an electrochromic device according to an embodiment.

FIG. 7 shows a bending test in which an electrochromic device according to an embodiment is bent and then unbent to its original shape.

FIG. 8 shows a test in which an electrochromic device according to an embodiment is bent and maintained for a predetermined time.

FIG. 9 shows a memory test in which an electrochromic device according to an embodiment is maintained for a predetermined time after the electric power is cut off.

FIG. 10 shows a plan view of a specimen for testing an electrochromic device according to an embodiment and a point for measurement of transmittance.

[Explanation of Reference Numerals]

| | |
|---|---|
| A-A': cutting line | 10: window |
| 100: electrochromic device | 110: first base layer |
| 111: first-A primer layer | 112: first-B primer layer |
| 120: first barrier layer | 121: first-A barrier layer |
| 122: first-B barrier layer | 123: first-C barrier layer |
| 130: light transmission variable structure | 131: first electrode layer |
| 133: first chromic layer | 135: electrolyte layer |
| 137: second chromic layer | 139: second electrode layer |
| 140: second barrier layer | 141: second-A barrier layer |
| 142: second-B barrier layer | 143: second-C barrier layer |
| 150: second base layer | 151: second-A primer layer |
| 152: second-B primer layer | 160: release film layer |
| 161: adhesive layer | 170: hard coat layer |

L: length of an electrochromic device
D: distance between both ends of an electrochromic device

BEST MODE FOR CARRYING OUT THE INVENTION

Hereinafter, the embodiments will be described in detail with reference to the accompanying drawings so that those of ordinary skill in the art to which the present invention pertains can easily practice them. However, the embodiments may be implemented in various different forms and are not limited to the embodiments described in the present specification.

In the present specification, in the case where each film, window, panel, structure, or layer is mentioned to be formed "on" or "under" another film, window, panel, structure, or layer, it means not only that one element is directly formed on or under another element, but also that one element is indirectly formed on or under another element with other element(s) interposed between them.

In addition, the term on or under with respect to each element may be referenced to the drawings. For the sake of description, the sizes of individual elements in the appended drawings may be exaggeratedly depicted and do not indicate the actual sizes. In addition, the same reference numerals refer to the same elements throughout the specification.

Throughout the present specification, when a part is referred to as "comprising" an element, it is understood that other elements may be comprised, rather than other elements are excluded, unless specifically stated otherwise.

In the present specification, a singular expression is understood to encompass a singular or plural expression, interpreted in context, unless otherwise specified.

In addition, all numbers and expressions relating to quantities of components, reaction conditions, and the like used herein are to be understood as being modified by the term "about" unless specifically stated otherwise.

Throughout the present specification, the terms first, second, and the like are used to describe various components. But the components should not be limited by the terms. The terms are used for the purpose of distinguishing one component from another.

Electrochromic Device

The embodiments aim to provide an electrochromic device having flexibility while achieving an excellent light transmission adjusting function based on the electrochromic principle.

The electrochromic device according to an embodiment comprises a first base layer, a second base layer, and a light transmission variable structure interposed between them.

The light transmission variable structure comprises a first chromic layer capable of adjusting coloration and decoloration according to the application of electric power.

In addition, the light transmission variable structure further comprises a first electrode layer under the first chromic layer; an electrolyte layer on the first chromic layer; a second chromic layer on the electrolyte layer; and a second electrode layer on the second chromic layer, wherein the first chromic layer comprises a reducing chromic material and a polymer resin, and the second chromic layer comprises an oxidizing chromic material and a polymer resin.

The electrochromic device (100) according to an embodiment comprises a light transmission variable structure (130) interposed between a first base layer (110) and a second base layer (150), wherein the light transmission variable structure (130) comprises a first chromic layer (133) and a second chromic layer (137) (see FIGS. 3 and 4).

The electrochromic device (100) according to a specific embodiment comprises a light transmission variable structure (130) interposed between a first base layer (110) and a second base layer (150), wherein the light transmission variable structure (130) comprises a first chromic layer (133) and a second chromic layer (137), and an electrolyte layer (135) is interposed between the first chromic layer (133) and the second chromic layer (137) (see FIGS. 3 and 4).

The electrochromic device (100) may be a flexible electrochromic device. In addition, the electrochromic device may have a sheet or film form. The electrochromic device (100) may have a thickness of 20 μm to 1,000 μm. Specifically, the thickness of the electrochromic device (100) may be 25 μm to 900 μm, 25 μm to 800 μm, 25 μm to 700 μm, 25 μm to 600 μm, or 25 μm to 500 μm, but it is not limited thereto.

The electrochromic device may have an average transmittance for visible light of 40% to 90%, 50% to 90%, or 60% to 80%, in the maximum decolored state, but it is not limited thereto. In addition, the electrochromic device may have an average transmittance for visible light of 10% to 40%, 10% to 30% or 10% to 20%, in the maximum colored state, but it is not limited thereto.

The electrochromic device may control the transmittance for infrared rays (IR rays) and ultraviolet rays (UV rays) as well as visible light during coloration and decoloration.

The features such as components and properties of each layer of the electrochromic device described above may be combined with each other.

Flexibility of the Electrochromic Device

The electrochromic device according to the embodiment achieves an excellent light transmission variable function based on the electrochromic principle while securing characteristics of flexibility. In particular, the electrochromic device according to an embodiment has little change in transmittance as compared with the initial stage, and the transmittance operation function can be maintained as it is, even when the electrochromic device is subjected to repeated bending, when it is maintained in the bent state for a long period of time, or when the power is cut off for a long period of time. For example, when the electrochromic device is bent in a tensile or compressive direction with respect to the first chromic layer or the second chromic layer, the chromic function can be maintained.

In the electrochromic device (100) according to an embodiment, the value of $\Delta TTd_{24}$ as defined in the following Equation (1) is 3% or less.

$$\Delta TTd_{24}(\%) = |TTd_{24} - TTd_0| \qquad (1)$$

In Equation (1), $TTd_0$ is the average transmittance (%) of visible light in the maximum decolored state when electric power is applied after the electrochromic device is deformed to have a radius of curvature of 17R (17 mm), and $TTd_{24}$ is the average transmittance (%) of visible light measured after $TTd_0$ is measured, the electric power is turned off, and the electrochromic device deformed to have a radius of curvature of 17R (17 mm) is maintained for 24 hours.

Specifically, in the electrochromic device (100), the value of $\Delta TTd_{24}$ as defined in the above Equation (1) may be 2.5% or less, 2.0% or less, 1.8% or less, 1.5% or less, 0% to 3%, 0% to 2.5%, 0.1% to 2.0%, 0.2% to 1.5%, or 0.5% to 1.5%, but it is not limited thereto.

In the present specification, the "maximum decolored state" refers to a state in which a voltage is applied to an electrochromic device to have the highest transmittance. Specifically, it may mean a state in which a change of less than 1% in the transmittance of visible light for 20 seconds lasts for 1 minute or longer when the decoloration operation is carried out by applying electric power to the electrochromic device.

In addition, the "maximum colored state" refers to a state in which a voltage is applied to an electrochromic device to have the lowest transmittance. Specifically, it may mean a state in which a change of less than 1% in the transmittance of visible light for 20 seconds lasts for 1 minute or longer when the coloration operation is carried out by applying electric power to the electrochromic device.

In the present specification, the "transmittance" refers to a transmittance of visible light, specifically, an average transmittance of visible light. More specifically, the average transmittance of visible light is based on an average of the values measured at 5 nm intervals in the wavelength range of 380 nm to 780 nm using Ultraviolet spectrum of JASCO.

In addition, in the electrochromic device (100), the value of $\Delta TTd_{12}$ as defined in the following Equation (4) is 1% or less.

$$\Delta TTd_{12}(\%) = |TTd_{12} - TTd_0| \qquad (4)$$

In Equation (4), $TTd_0$ is the average transmittance (%) of visible light in the maximum decolored state when electric power is applied after the electrochromic device is deformed to have a radius of curvature of 17R (17 mm), and $TTd_{12}$ is the average transmittance (%) of visible light measured after $TTd_0$ is measured, the electric power is turned off, and the electrochromic device deformed to have a radius of curvature of 17R (17 mm) is maintained for 12 hours.

Specifically, in the electrochromic device (100), the value of $\Delta TTd_{12}$ as defined in the above Equation (4) may be 0.8% or less, 0.7% or less, 0.6% or less, 0.5% or less, 0% to 1%, 0% to 0.8%, 0% to 0.7%, 0.1% to 0.6%, or 0.1% to 0.5%, but it is not limited thereto.

As the $\Delta TTd_{24}$ value defined in Equation (1) and the $\Delta TTd_{12}$ value defined in Equation (4) of the electrochromic device satisfy the above ranges, the electrochromic device can achieve a certain level of the desired transmittance performance even after the electric power is turned off.

If the $\Delta TTd_{24}$ value defined in Equation (1) or the $\Delta TTd_{12}$ value defined in Equation (4) exceeds the above range, it means that the decoloration retention performance, especially the retention performance in the colored state, is deteriorated. There is a problem in that the transmittance of the electrochromic device does not reach a desired level of performance when electric power is cut off, so that it is not suitable for commercialization as a smart window.

In the electrochromic device (100), the average transmittance ($TTd_0$; %) of visible light in the maximum decolored state is 60% or more when electric power is applied after the electrochromic device is deformed to have a radius of curvature of 17R (17 mm). Specifically, the $TTd_0$ value is 65% or more, 66% or more, or 67% or more.

As the $TTd_0$ value of the electrochromic device satisfies the above range, a wide range of the transmittance of visible light can be secured, and it is easy to achieve a user-customized smart window.

In addition, in the electrochromic device (100), the value of $\Delta TTc_{24}$ as defined in the following Equation (2) is 2% or less.

$$\Delta TTc_{24}(\%) = |TTc_{24} - TTc_0| \qquad (2)$$

In Equation (2), $TTc_0$ is the average transmittance (%) of visible light in the maximum colored state when electric power is applied after the electrochromic device is deformed to have a radius of curvature of 17R (17 mm), and $TTc_{24}$ is the average transmittance (%) of visible light measured after $TTc_0$ is measured, the electric power is turned off, and the electrochromic device deformed to have a radius of curvature of 17R (17 mm) is maintained for 24 hours.

Specifically, in the electrochromic device (100), the value of $\Delta TTc_{24}$ as defined in the above Equation (2) may be 1.8% or less, 1.5% or less, 1.2% or less, 1.1% or less, 0% to 2%, 0% to 1.8%, 0% to 1.5%, 0.1% to 1.5%, 0.3% to 1.2%, or 0.4% to 1.1%, but it is not limited thereto.

In addition, in the electrochromic device (100), the value of $\Delta TTc_{12}$ as defined in the following Equation (5) is 0.8% or less.

$$\Delta TTc_{12}(\%) = |TTc_{12} - TTc_0| \qquad (5)$$

In Equation (5), $TTc_0$ is the average transmittance (%) of visible light in the maximum colored state when electric power is applied after the electrochromic device is deformed to have a radius of curvature of 17R (17 mm), and $TTc_{12}$ is the average transmittance (%) of visible light measured after $TTc_0$ is measured, the electric power is turned off, and the electrochromic device deformed to have a radius of curvature of 17R (17 mm) is maintained for 12 hours.

Specifically, in the electrochromic device (100), the value of $\Delta TTc_{12}$ as defined in the above Equation (5) may be 0.7% or less, 0.6% or less, 0.5% or less, 0% to 0.8%, 0% to 0.7%, 0% to 0.6%, 0.1% to 0.6%, or 0.2% to 0.5%, but it is not limited thereto.

As the $\Delta TTc_{24}$ value defined in Equation (2) and the $\Delta TTc_{12}$ value defined in Equation (5) of the electrochromic device satisfy the above ranges, the electrochromic device can achieve a certain level of the desired transmittance performance even after the electric power is turned off.

If the $\Delta TTc_{24}$ value defined in Equation (2) or the $\Delta TTc_{12}$ value defined in Equation (5) exceeds the above range, it means that the decoloration retention performance, especially the retention performance in the colored state, is deteriorated. There is a problem in that the transmittance of the electrochromic device does not reach a desired level of performance when electric power is cut off, so that it is not suitable for commercialization as a smart window.

In the electrochromic device (100), the average transmittance ($TTc_0$; %) of visible light in the maximum colored state is 20% or less when electric power is applied after the electrochromic device is deformed to have a radius of curvature of 17R (17 mm). Specifically, the $TTc_0$ value is 17% or less, 15% or less, or 14% or less.

As the $TTc_0$ value of the electrochromic device satisfies the above range, the band for color changes between transparency and darkness is wider, a wide range of the transmittance of visible light can be secured, and it is easy to achieve a user-customized smart window.

In addition, the electrochromic device is excellent in the blocking performance of UV rays and IR rays as well as visible light, whereby it is possible to easily control light and heat coming from the outside. As a result, it is possible to control indoor brightness, to block UV rays, and to save energy for indoor cooling/heating.

In the electrochromic device (100), the value of TTRdc as defined in the following Equation (3) is 90% or more.

$$TTRdc(\%)=(\Delta TTdc_{24}/\Delta TTdc_0)\times 100 \quad (2)$$

In Equation (3), $\Delta TTdc_0$ is the difference (%) between the average transmittance of visible light in the maximum decolored state and the average transmittance of visible light in the maximum colored state as measured after the electrochromic device is deformed to have a radius of curvature of 17R (17 mm), and when electric power is applied; and $\Delta TTdc_{24}$ is the difference (%) between the average transmittance of visible light in the maximum decolored state and the average transmittance of visible light in the maximum colored state as measured after $TTdc_0$ is measured, the electric power is turned off, and the electrochromic device deformed to have a radius of curvature of 17R (17 mm) is maintained for 24 hours, and when electric power is applied.

Specifically, in the electrochromic device (100), the value of TTRdc as defined in the above Equation (3) may be 92% or more, 95% or more, 97% or more, 98% or more, 99% or more, 99.3% or more, or 99.4% or more, but it is not limited thereto.

As the TTRdc value of the electrochromic device as defined in Equation (3) satisfies the above range, it is possible to achieve an excellent light transmission variable function even after the deformed state to have a small radius of curvature is maintained for several hours. As a result, it is easy to store and transport as it is maintained in a roll form, and it can be used without a deterioration in performance even after construction.

The electrochromic device (100) has no cracks when it is deformed to have a radius of curvature of 70R (70 mm). Specifically, the electrochromic device (100) has no cracks when it is deformed to have a radius of curvature of 70R (70 mm) or less. For example, the electrochromic device (100) has no cracks when it is deformed to have a radius of curvature of 30R (30 mm) or a radius of curvature of 17R (17 mm).

Bending Characteristics of the Electrochromic Device

In addition, when the electrochromic device is repeatedly bent to a distance (D) corresponding to 25% of the length (L) in the longitudinal direction as shown in FIG. 7 and then unbent, there may be little change in transmittance. In addition, when the electrochromic device is bent to a distance (D) corresponding to 25% of the length (L) in the longitudinal direction as shown in FIG. 8 and then maintained for a long period of time, there may be little change in transmittance. In addition, when the electrochromic device is powered off and maintained for a long period of time as shown in FIG. 9, there may be little change in transmittance.

According to an embodiment, when the electrochromic device, based on a specimen having a size of 300 mm in length and 200 mm in width, is subjected to a repeated bending test in which the specimen is bent such that the distance between both ends in the longitudinal direction is 75 mm and then unbent to the original state, the first change ($\Delta TT\_B30$) in transmittance as defined in the following Equation (i) is within 1.5%.

$$\Delta TT\_B30(\%)=|TT\_B30-TT\_0| \quad (i)$$

In Equation (i), TT_B30 is the average transmittance (%) of visible light of the electrochromic device measured in the maximum decolored state after the bending test is repeated 30 times, and TT_0 is the average transmittance (%) of visible light of the electrochromic device measured in the maximum decolored state before the bending test.

More specifically, the first change ($\Delta TT\_B30$) in transmittance may be within 1%, within 0.5%, or within 0.3%.

In addition, the values of TT_B30 and TT_0 in Equation (i) may each be 50% or more, 60% or more, or 65% or more, and 90% or less, 80% or less, or 70% or less. Specifically, the values of TT_B30 and TT_0 in Equation (i) may each be 50% to 90%, 60% to 80%, or 65% to 70%.

In addition, when the electrochromic device is subjected to the repeated bending test, the second change ($\Delta TT\_B30\_d$) in transmittance as defined in the following Equation (ii) may be within 3%.

$$\Delta TT\_B30\_d\ (\%)=||TT\_B30-TT\_B30'|-|TT\_0-TT\_0'|| \quad (ii)$$

In Equation (ii), TT_B30 is the average transmittance (%) of visible light of the electrochromic device measured in the maximum decolored state after the bending test is repeated 30 times, TT_B30' is the average transmittance (%) of visible light of the electrochromic device measured in the maximum colored state after the bending test is repeated 30 times, TT_0 is the average transmittance (%) of visible light of the electrochromic device measured in the maximum decolored state before the bending test, and TT_0' is the average transmittance (%) of visible light of the electrochromic device measured in the maximum colored state before the bending test.

More specifically, the second change ($\Delta TT\_B30\_d$) in transmittance may be within 2%, within 1%, within 0.5%, or within 0.3%.

In addition, the values of TT_B30 and TT_0 in Equation (ii) may each be 50% or more, 60% or more, or 65% or more, and 90% or less, 80% or less, or 70% or less. Specifically, the values of TT_B30 and TT_0 in Equation (ii) may each be 50% to 90%, 60% to 80%, or 65% to 70%.

In addition, the values of TT_B30' and TT_0' in Equation (ii) may each be 30% or less, 20% or less, or 15% or less, and 0% or more, 5% or more, or 10% or more. Specifically, the values of TT_B30' and TT_0' in Equation (ii) may each be 0% to 30%, 5% to 10%, or 10% to 15%.

In addition, when the electrochromic device is subjected to the repeated bending test, the third change (ΔTT_B50) in transmittance as defined in the following Equation (iii) may be within 3%.

$$\Delta TT\_B50 (\%) = |TT\_B50 - TT\_0| \tag{iii}$$

In Equation (iii), TT_B50 is the average transmittance (%) of visible light of the electrochromic device measured in the maximum decolored state after the bending test is repeated 50 times, and TT_0 is the average transmittance (%) of visible light of the electrochromic device measured in the maximum decolored state before the bending test.

More specifically, the third change (ΔTT_B50) in transmittance may be within 2%, within 1%, within 0.5%, or within 0.3%.

In addition, the values of TT_B50 and TT_0 in Equation (iii) may each be 50% or more, 60% or more, or 65% or more, and 90% or less, 80% or less, or 70% or less. Specifically, the values of TT_B50 and TT_0 in Equation (iii) may each be 50% to 90%, 60% to 80%, or 65% to 70%.

In addition, when the electrochromic device, based on a specimen having a size of 300 mm in length and 200 mm in width, is subjected to a retention test in which the specimen is bent such that the distance between both ends in the longitudinal direction is 75 mm and maintained for a certain period of time, the fourth change (ΔTT_100H) in transmittance as defined in the following Equation (iv) is within 3%.

$$\Delta TT\_100H (\%) = |TT\_100H - TT\_0| \tag{iv}$$

In Equation (iv), TT_100H is the average transmittance (%) of visible light of the electrochromic device measured in the maximum decolored state after the retention test is carried out for 100 hours, and TT_0 is the average transmittance (%) of visible light of the electrochromic device measured in the maximum decolored state before the retention test.

More specifically, the fourth change (ΔTT_100H) in transmittance may be within 2%, within 1%, within 0.5%, or within 0.3%.

In addition, the values of TT_100H and TT_0 in Equation (iv) may each be 50% or more, 60% or more, or 65% or more, and 90% or less, 80% or less, or 70% or less. Specifically, the values of TT_100H and TT_0 in Equation (iv) may each be 50% to 90%, 60% to 80%, or 65% to 70%.

In addition, when the electrochromic device is subjected to the repeated bending test after the retention test has been carried out, the fifth change (ΔTT_100H_B30) in transmittance as defined in the following Equation (v) may be within 3%.

$$\Delta TT\_100H\_B30 (\%) = |TT\_100H\_B30 - TT\_0| \tag{v}$$

In Equation (v), TT_100H_B30 is the average transmittance (%) of visible light of the electrochromic device measured in the maximum decolored state after the retention test is carried out for 100 hours and the bending test is then repeated 30 times, and TT_0 is the average transmittance (%) of visible light of the electrochromic device measured in the maximum decolored state before the retention test.

More specifically, the fifth change (ΔTT_100H_B30) in transmittance may be within 2%, within 1%, within 0.5%, or within 0.3%.

In addition, the values of TT_100H_B30 and TT_0 in Equation (v) may each be 50% or more, 60% or more, or 65% or more, and 90% or less, 80% or less, or 70% or less. Specifically, the values of TT_100H_B30 and TT_0 in Equation (v) may each be 50% to 90%, 60% to 80%, or 65% to 70%.

In addition, when the electrochromic device is subjected to the repeated bending test and to a memory test in which electric power is applied to make the maximum decolored state, the electric power is cut off, and it is maintained for a certain period of time, the sixth change (ΔTT_B30_M12H) in transmittance as defined in the following Equation (vi) may be within 3%.

$$\Delta TT\_B30\_M12H (\%) = |TT\_B30\_M12H - TT\_0| \tag{vi}$$

In Equation (vi), TT_B30_M12H is the average transmittance (%) of visible light of the electrochromic device measured after the bending test is repeated 30 times, and the memory test is then carried out for 12 hours in the maximum decolored state, and TT_0 is the average transmittance (%) of visible light of the electrochromic device measured in the maximum decolored state before the bending test.

More specifically, the sixth change (ΔTT_B30_M12H) in transmittance may be within 2%, within 1%, within 0.5%, or within 0.3%.

In addition, the values of TT_B30_M12H and TT_0 in Equation (vi) may each be 50% or more, 60% or more, or 65% or more, and 90% or less, 80% or less, or 70% or less. Specifically, the values of TT_100H_B30_M12H and TT_0 in Equation (vi) may each be 50% to 90%, 60% to 80%, or 65% to 70%.

The average transmittance of visible light mentioned in the above Equations (i) to (vi) refers to an average value of transmittance in the wavelength range of visible light. Specifically, it may be an average of transmittance values measured at 5 nm intervals in the wavelength range of 380 to 780 nm.

Base Layer

The first base layer (110) and the second base layer (150) are layers for maintaining transparency and durability and may comprise a polymer resin. For example, the first base layer and the second base layer may be a polymer film.

Specifically, the first base layer and the second base layer may each comprise one or more selected from the group consisting of polyethylene terephthalate (PET), polyethylene naphthalate (PEN), polycarbonate (PC), polyimide (PI), polycyclohexylenedimethylene terephthalate (PCT), polyethersulfone (PES), nylon, polymethyl methacrylate (PMMA), and cycloolefin polymer (COP), but it is not limited thereto. More specifically, the first base layer and the second base layer may each comprise polyethylene terephthalate (PET).

As the first base layer and the second base layer comprise the polymer resin described above, it is possible to achieve an electrochromic device having both durability and flexibility.

The first base layer and the second base layer may each have a light transmittance of 80% or more for light having a wavelength of 630 nm. Specifically, the first base layer and the second base layer may each have a light transmittance of 85% or more or 90% or more for light having a wavelength of 630 nm. In addition, the first base layer and the second base layer may each have a light transmittance of 80% or more for light having a wavelength of 550 nm. Specifically, the first base layer and the second base layer may each have a light transmittance of 85% or more or 90% or more for light having a wavelength of 550 nm.

The first base layer and the second base layer may each have a haze of less than 2.0%, 1.8% or less, or 1.5% or less. The first base layer and the second base layer may each have an elongation of 80% or more. Specifically, the first base layer and the second base layer may each have an elongation of 90% or more, 100% or more, or 120% or more. As the first base layer and the second base layer each satisfy a light transmittance and a haze in the above ranges, transparency can be attained. As they satisfy an elongation in the above range, flexibility can be attained.

The first base layer may have a thickness of 10 μm to 300 μm. Specifically, the thickness of the first base layer may be 10 μm to 250 μm, 10 μm to 200 μm, 20 μm to 250 μm, 20 μm to 200 μm, 25 μm to 200 μm, 25 μm to 188 μm, or 50 μm to 150 μm, but it is not limited thereto.

The second base layer may have a thickness of 10 μm to 300 μm. Specifically, the thickness of the second base layer may be 10 μm to 250 μm, 10 μm to 200 μm, 20 μm to 250 μm, 20 μm to 200 μm, 25 μm to 200 μm, 25 μm to 188 μm, or 50 μm to 150 μm, but it is not limited thereto. In addition, the thickness of the first base layer and the thickness of the second base layer may each be 50 μm to 180 μm, 70 μm to 180 μm, 80 μm to 180 μm, 100 μm to 180 μm, 100 μm to 170 μm, or 100 μm to 150 μm, but they are not limited thereto. As the thickness of the first base layer and the thickness of the second base layer each satisfy the above ranges, it is possible to achieve a certain level of elongation and tensile strength of the electrochromic device. In addition, the electrochromic device would not have cracks in the respective layers even when it is bent, it is possible to achieve a thin, lightweight, and flexible electrochromic device, and it is advantageous for thinning Barrier Layer The barrier layer serves to prevent the penetration of impurities including moisture or gas into the light transmission variable structure from the outside. For example, it may comprise a first barrier layer and a second barrier layer.

Referring to FIG. 3, the electrochromic device (100) may comprise a first base layer (110); a first barrier layer (120) on the first base layer (100); a light transmission variable structure (130) on the first barrier layer (120); a second barrier layer (140) on the light transmission variable structure (130); and a second base layer (150) on the second barrier layer (140).

The first barrier layer (120) and the second barrier layer (140) may each comprise two or more layers. Specifically, the first barrier layer (120) and the second barrier layer (140) may each comprise two layers or three layers (see FIG. 5).

In an embodiment, the first barrier layer (120) may comprise two layers, and the second barrier layer (140) may comprise two layers.

In another embodiment, the first barrier layer (120) may comprise three layers, and the second barrier layer (140) may comprise three layers.

The first barrier layer (120) may comprise a first-A barrier layer (121) and a first-B barrier layer (122), or the first barrier layer may comprise a first-A barrier layer (121), a first-B barrier layer (122), and a first-C barrier layer (123) (see FIG. 5).

Specifically, the first barrier layer may have a structure in which a first-A barrier layer and a first-B barrier layer are sequentially laminated; or a structure in which a first-A barrier layer, a first-B barrier layer, and a first-C barrier layer are sequentially laminated.

The first barrier layer may be laminated on the first base layer.

The second barrier layer (140) may comprise a second-A barrier layer (141) and a second-B barrier layer (142), or the second barrier layer may comprise a second-A barrier layer (141), a second-B barrier layer (142), and a second-C barrier layer (143) (see FIG. 5).

Specifically, the second barrier layer may have a structure in which a second-A barrier layer and a second-B barrier layer are sequentially laminated; or a structure in which a second-A barrier layer, a second-B barrier layer, and a second-C barrier layer are sequentially laminated.

The second barrier layer may be laminated under the second base layer.

In an embodiment, the first barrier layer (120) may comprise a first-A barrier layer (121) and a first-B barrier layer (122), and the second barrier layer (140) may comprise a second-A barrier layer (141) and a second-B barrier layer (142). Alternatively, the first barrier layer (120) may comprise a first-A barrier layer (121), a first-B barrier layer (122), and a first-C barrier layer (123), and the second barrier layer (140) may comprise a second-A barrier layer (141) and a second-B barrier layer (142).

The first barrier layer (120) and the second barrier layer (140) each comprise at least one selected from the group consisting of metal oxides, metal nitrides, metal oxynitrides, metalloid oxides, metalloid nitrides, metalloid oxynitrides, and combinations thereof.

Specifically, the first barrier layer (120) and the second barrier layer (140) each comprise at least one selected from the group consisting of metal nitrides, metal oxynitrides, metalloid nitrides, metalloid oxynitrides, and combinations thereof.

More specifically, the first barrier layer (120) and the second barrier layer (140) each comprise a metal nitride or a metalloid nitride.

In an embodiment, the first barrier layer (120) may comprise a first-A barrier layer (121) and a first-B barrier layer (122), wherein one of the first-A barrier layer and the first-B barrier layer may comprise a metal oxide or a metalloid oxide, and the other may comprise a metal nitride or a metalloid nitride.

The first barrier layer (120) may further comprise a first-C barrier layer (123). In such a case, the first-C barrier layer may comprise an acrylic-based resin, an epoxy-based resin, a silicone-based resin, a polyimide-based resin, or a polyurethane-based resin.

In addition, the second barrier layer (140) may comprise a second-A barrier layer (141) and a second-B barrier layer (142), wherein one of the second-A barrier layer and the second-B barrier layer may comprise a metal oxide or a metalloid oxide, and the other may comprise a metal nitride or a metalloid nitride.

The second barrier layer (140) may further comprise a second-C barrier layer (143). In such a case, the second-C barrier layer may comprise an acrylic-based resin, an epoxy-based resin, a silicone-based resin, a polyimide-based resin, or a polyurethane-based resin.

In another embodiment, the first barrier layer comprises a first-A barrier layer and a first-B barrier layer, wherein the thickness ratio of the first-A barrier layer and the first-B barrier layer is 1:2 to 1:10. In such a case, the first-A barrier layer comprises a metal nitride or a metalloid nitride, and the first-B barrier layer comprises a metal oxide or a metalloid oxide.

The thickness ratio of the first-A barrier layer and the first-B barrier layer may be 1:2.5 to 1:7.5, but it is not limited thereto.

As the thickness ratio of the first-A barrier layer and the first-B barrier layer satisfies the above range, there is an effect that long-term reliability such as optical properties, refractive index, and weatherability of a film are improved. If the thickness ratio of the first-A barrier layer and the first-B barrier layer is outside the above range, the refractive index may be decreased, it becomes opaque, or long-term reliability such as optical properties and weatherability may be decreased.

In addition, the second barrier layer comprises a second-A barrier layer and a second-B barrier layer, wherein the thickness ratio of the second-A barrier layer and the second-B barrier layer may be 1:2 to 1:10. In such a case, the second-A barrier layer comprises a metal nitride or a metalloid nitride, and the second-B barrier layer comprises a metal oxide or a metalloid oxide.

The thickness ratio of the second-A barrier layer and the second-B barrier layer may be 1:2.5 to 1:7.5, but it is not limited thereto.

As the thickness ratio of the first-A barrier layer and the first-B barrier layer and the thickness ratio of the second-A barrier layer and the second-B barrier layer satisfy the above ranges, there is an effect that long-term reliability such as optical properties, refractive index, and weatherability of a film are improved.

On the other hand, if the thickness ratio of the first-A barrier layer and the first-B barrier layer or the thickness ratio of the second-A barrier layer and the second-B barrier layer is outside the above range, the refractive index may be decreased, it becomes opaque, or long-term reliability such as optical properties and weatherability may be decreased.

In an embodiment, the first barrier layer comprises a first-A barrier layer and a first-B barrier layer, wherein the first base layer, the first-A barrier layer, and the first-B barrier layer are sequentially laminated, the first-A barrier layer comprises a metal nitride or a metalloid nitride, and the first-B barrier layer comprises a metal oxide or a metalloid oxide.

In another embodiment, the first barrier layer comprises a first-A barrier layer, a first-B barrier layer, and a first-C barrier layer, wherein the first base layer, the first-A barrier layer, the first-B barrier layer, and the first-C barrier layer are sequentially laminated, the first-A barrier layer comprises a metal nitride or a metalloid nitride, the first-B barrier layer comprises a metal oxide or a metalloid oxide, and the first-C barrier layer comprises an acrylic-based resin, an epoxy-based resin, a silicone-based resin, a polyimide-based resin, or a polyurethane-based resin.

In such a case, the first-A barrier layer may have a thickness of 10 nm to 50 nm, nm to 40 nm, or 10 nm to 30 nm, but it is not limited thereto.

In addition, the first-B barrier layer may have a thickness of 30 nm to 100 nm, 30 nm to 80 nm, 30 nm to 70 nm, or 40 nm to 60 nm, but it is not limited thereto.

The first-A barrier layer and the first-B barrier layer may each have a moisture permeability of 0.2 g/day·m$^2$ or less, 0.15 g/day·m$^2$ or less, or 0.1 g/day·m$^2$ or less, but it is not limited thereto.

As the thickness range and moisture permeability of the first-A barrier layer and the first-B barrier layer satisfy the above ranges, there is an effect that long-term reliability such as optical properties, refractive index, and weatherability of a film are improved.

On the other hand, if they are outside the above ranges, the refractive index may be decreased, it becomes opaque, or long-term reliability such as optical properties and weatherability may be decreased.

In an embodiment, the second barrier layer comprises a second-A barrier layer and a second-B barrier layer, wherein the second base layer, the second-A barrier layer, and the second-B barrier layer are sequentially laminated, the second-A barrier layer comprises a metal nitride or a metalloid nitride, and the second-B barrier layer comprises a metal oxide or a metalloid oxide.

In addition, the second barrier layer comprises a second-A barrier layer, a second-B barrier layer, and a second-C barrier layer, wherein the second base layer, the second-A barrier layer, the second-B barrier layer, and the second-C barrier layer are sequentially laminated, the second-A barrier layer comprises a metal nitride or a metalloid nitride, the second-B barrier layer comprises a metal oxide or a metalloid oxide, and the second-C barrier layer comprises an acrylic-based resin, an epoxy-based resin, a silicone-based resin, a polyimide-based resin, or a polyurethane-based resin.

In such a case, the second-A barrier layer may have a thickness of 10 nm to 50 nm, 10 nm to 40 nm, or 10 nm to 30 nm, but it is not limited thereto.

In addition, the second-B barrier layer may have a thickness of 30 nm to 100 nm, nm to 80 nm, 30 nm to 70 nm, or 40 nm to 60 nm, but it is not limited thereto.

The second-A barrier layer and the second-B barrier layer may each have a moisture permeability of 0.2 g/day·m$^2$ or less, 0.15 g/day·m$^2$ or less, or 0.1 g/day·m$^2$ or less, but it is not limited thereto.

As the thickness range and moisture permeability of the second-A barrier layer and the second-B barrier layer satisfy the above ranges, there is an effect that long-term reliability such as optical properties, refractive index, and weatherability of a film are improved. On the other hand, if they are outside the above ranges, the refractive index may be decreased, it becomes opaque, or long-term reliability such as optical properties and weatherability may be decreased.

The moisture permeability of the first barrier layer may be the same as, or different from, that of the second barrier layer. Specifically, the moisture permeability of the first barrier layer may be different from that of the second barrier layer.

As a specific embodiment, the first barrier layer comprises a first-A barrier layer and a first-B barrier layer, wherein the first base layer, the first-A barrier layer, and the first-B barrier layer are sequentially laminated, the first-A barrier layer comprises a silicon nitride (SiNx), and the first-B barrier layer comprises a silicon oxide (SiOx). In addition, optionally, the first barrier layer may further comprise a first-C barrier layer comprising an acrylic-based resin.

When the first-A barrier layer comprises a silicon nitride, the ratio of Si:N may be 1.0:0.8 to 1.0:1.2, but it is not limited thereto. When the first-B barrier layer comprises a silicon oxide, the ratio of Si:O may be 1.0:1.7 to 1.0:2.3, but it is not limited thereto.

In addition, the second barrier layer comprises a second-A barrier layer and a second-B barrier layer, wherein the second base layer, the second-A barrier layer, and the second-B barrier layer are sequentially laminated, the second-A barrier layer comprises a silicon nitride (SiNx), and the second-B barrier layer comprises a silicon oxide (SiOx). In addition, optionally, the second barrier layer may further comprise a second-C barrier layer comprising an acrylic-based resin, an epoxy-based resin, a silicone-based resin, a polyimide-based resin, or a polyurethane-based resin.

When the second-A barrier layer comprises a silicon nitride, the ratio of Si:N may be 1.0:0.8 to 1.0:1.2, but it is not limited thereto. When the second-B barrier layer comprises a silicon oxide, the ratio of Si:O may be 1.0:1.7 to 1.0:2.3, but it is not limited thereto.

As the first barrier layer and the second barrier layer satisfy the above conditions, a desired performance can be achieved even with a thin thickness, and the prevention of moisture penetration can be maximized, whereby the durability and long-term stability of the electrochromic device can be enhanced.

The first barrier layer and the second barrier layer may be deposited on the first base layer and the second base layer by a vacuum deposition method, respectively. Specifically, the first barrier layer and the second barrier layer may be deposited on each of the first base layer and the second base layer by a sputtering deposition method.

In such a case, the deposition raw material may be one or more of a metal or a metalloid, and the type is not particularly limited. For example, it may comprise at least one selected from magnesium (Mg), silicon (Si), indium (In), titanium (Ti), bismuth (Bi), germanium (Ge), and aluminum (Al).

The deposition reaction gas may comprise oxygen ($O_2$) gas or nitrogen ($N_2$) gas. If oxygen gas is used as the reaction gas, a barrier layer comprising a metal oxide or a metalloid oxide may be formed. If nitrogen gas is used as the reaction gas, a barrier layer comprising a metal nitride or a metalloid nitride may be formed. If oxygen gas and nitrogen gas are appropriately mixed and used as the reaction gas, a barrier layer comprising a metal oxynitride or a metalloid oxynitride may be formed.

The vacuum deposition method includes a physical vacuum deposition method and a chemical vacuum deposition method. The physical vacuum deposition method includes thermal vacuum deposition, E-beam vacuum deposition, and sputtering deposition.

The sputtering may be DC magnetron sputtering or AC magnetron sputtering.

The DC magnetron sputtering may be, specifically, plasma sputtering, for example, reactive plasma sputtering.

Light Transmission Variable Structure

The light transmission variable structure (130) comprises a first electrode layer (131); a first chromic layer (133) on the first electrode layer (131); an electrolyte layer (135) on the first chromic layer (133); a second chromic layer (137) on the electrolyte layer (135); and a second electrode layer (139) on the second chromic layer (137) (see FIG. 4).

The light transmission variable structure (130) may be a structure in which a first electrode layer (131), a first chromic layer (133), an electrolyte layer (135), a second chromic layer (137), and a second electrode layer (139) are sequentially laminated.

Specifically, the light transmittance variable structure is a laminate structure in which the light transmittance is reversibly changed when a predetermined voltage is applied.

Specifically, when a voltage is applied to the first electrode layer (131) and the second electrode layer (139), the overall light transmittance increases and then decreases due to specific ions or electrons that move from the second chromic layer (137) to the first chromic layer (133) through the electrolyte layer (135).

If the light transmittance of the second chromic layer (137) is decreased, the light transmittance of the first chromic layer (133) is also decreased. If the light transmittance of the second chromic layer (137) is increased, the light transmittance of the first chromic layer (133) is also increased.

First Electrode Layer and Second Electrode Layer

The first electrode layer and the second electrode layer may each comprise a transparent electrode or a reflective electrode. In an embodiment, one of the first electrode layer and the second electrode layer may be a transparent electrode, and the other may be a reflective electrode. In another embodiment, both the first electrode layer and the second electrode layer may be transparent electrodes.

The first electrode layer (131) may be formed on the first barrier layer (120) by a sputtering deposition method. In addition, the second electrode layer (139) may be formed on the second barrier layer (140) by a sputtering deposition method.

The transparent electrode may be made of a material having high transmittance of light, low sheet resistance, and penetration resistance, and it may be formed in the shape of an electrode plate.

The transparent electrode may comprise one, for example, selected from the group consisting of indium-tin oxide (ITO), zinc oxide (ZnO), indium-zinc oxide (IZO), and combinations thereof.

The reflective electrode, for example, may comprise at least one selected from the group consisting of silver (Ag), aluminum (Al), copper (Cu), molybdenum (Mo), gold (Au), tungsten (W), chromium (Cr), and combinations thereof.

The first electrode layer (131) and the second electrode layer (139) may each have a thickness of 100 nm to 500 nm, 100 nm to 400 nm, 100 nm to 300 nm, or 150 nm to 250 nm, but it is not limited thereto.

The first electrode layer and the second electrode layer may each be a transparent electrode and comprise indium-tin oxide (ITO).

Specifically, the first electrode layer and the second electrode layer may each comprise indium oxide:tin oxide at a weight ratio of 70:30 to 98:2 or 80:20 to 97:3.

In addition, the first electrode layer and the second electrode layer may each have a surface resistance of 5 $\Omega$/sq to 100 $\Omega$/sq, 5 $\Omega$/sq to 80 $\Omega$/sq, 5 $\Omega$/sq to 70 $\Omega$/sq, or 5 $\Omega$/sq to 50 $\Omega$/sq, but it is not limited thereto.

First Chromic Layer

The first chromic layer (133) is a layer whose light transmittance changes when a voltage is applied between the first electrode layer (131) and the second electrode layer (139). It is a layer that imparts variability of light transmittance to the electrochromic device.

The first chromic layer (133) may comprise a material having a color development characteristic complementary to the electrochromic material contained in the second chromic layer (137). The complementary color development characteristic means that the types of reaction by which the electrochromic materials develop color are different from each other.

For example, if an oxidizing chromic material is used in the first chromic layer, a reducing chromic material may be used in the second chromic layer. If a reducing chromic material is used in the first chromic layer, an oxidizing chromic material may be used in the second chromic layer.

Specifically, the first chromic layer (133) may comprise a reducing chromic material, and the second chromic layer (137) may comprise an oxidizing chromic material. The oxidizing chromic material refers to a material that changes color when an oxidation reaction takes place, and the reducing chromic material refers to a material that changes color when a reduction reaction takes place.

That is, in a chromic layer to which an oxidizing chromic material has been applied, if an oxidation reaction takes place, a coloration reaction would take place; and if a reduction reaction takes place, a decoloration reaction would take place. In a chromic layer to which a reducing chromic material has been applied, if a reduction reaction takes place, a coloration reaction would take place; and if an oxidation reaction takes place, a decoloration reaction would take place.

As such materials having complementary color development characteristics are contained in the respective chromic layers, coloration or decoloration can be simultaneously carried out in both layers. In addition, coloration or decoloration may be alternated according to the polarity of voltage applied to the electrochromic device.

The first electrode layer (131) and the first chromic layer (133) may have an initial transmittance of 90% or more. Specifically, that the initial transmittance satisfies the above range means that each of the above-described layers has been applied very uniformly and is very transparent.

In an embodiment, the first chromic layer (133) may comprise a reducing chromic material and a polymer resin.

The reducing chromic material may be one or more selected from the group consisting of titanium oxide (TiO), vanadium oxide ($V_2O_5$), niobium oxide ($Nb_2O_5$), chromium oxide ($Cr_2O_3$), manganese oxide ($MnO_2$), iron oxide ($FeO_2$), cobalt oxide ($CoO_2$), nickel oxide ($NiO_2$), rhodium oxide ($RhO_2$), tantalum oxide ($Ta_2O_5$), iridium oxide ($IrO_2$), tungsten oxide ($WO_2$, $WO_3$, $W_2O_3$, $W_2O_5$), viologen, and combinations thereof, but it is not limited thereto.

The polymer resin may be a resin having flexibility and is not limited to a specific type. For example, the polymer resin may be one or more selected from the group consisting of silicone-based resins, acrylic-based resins, phenolic-based resins, polyurethane-based resins, polyimide-based resins, and ethylene vinyl acetate-based resins, but it is not limited thereto. For example, the first chromic layer (133) may comprise tungsten oxide ($WO_3$) and an acrylic-based resin.

The first chromic layer (133) may comprise a reducing chromic material and a polymer resin and may comprise the polymer resin in an amount of 0.1 to 15 parts by weight based on 100 parts by weight of the reducing chromic material. Specifically, it may comprise the polymer resin in an amount of 1 part by weight to 15 parts by weight, 2 parts by weight to 15 parts by weight, or 3 parts by weight to 10 parts by weight, based on 100 parts by weight of the reducing chromic material. As a preferred example, the first chromic layer may comprise 100 parts by weight of a reducing chromic material and 2 parts by weight to 12 parts by weight of a polymer resin. As another preferred example, the first chromic layer may comprise 100 parts by weight of a reducing chromic material and 3 parts by weight to 7 parts by weight of a polymer resin. Within the above preferred range, it may be more advantageous for suppressing a change in the transmittance of visible light that may occur when the electrochromic device is subjected to repeated bending, when it is maintained in a bent state for a long period of time, or when electric power is cut off for a long period of time.

On the other hand, if the first chromic layer comprises the polymer resin in excess of the above range based on 100 parts by weight of the reducing chromic material, the memory performance is deteriorated, whereby a certain level of transmittance cannot be maintained, or the chromic time taken to reach a certain transmittance may increase, resulting in a decrease in the chromic speed. In addition, if the first chromic layer comprises the polymer resin less than the above range based on 100 parts by weight of the reducing chromic material, the flexibility is deteriorated, resulting in cracks when the device is deformed to a small radius of curvature, and it may be difficult to achieve a certain level of light transmission variable function.

The first chromic layer (133) may comprise at least one layer and, for example, may comprise two or more layers of different materials.

The first chromic layer (133) may have a thickness of 100 nm to 1,000 nm, 200 nm to 1,000 nm, 200 nm to 800 nm, 200 nm to 700 nm, 300 nm to 700 nm, or 300 nm to 600 nm. If the thickness of the first chromic layer satisfies the above range, a change in light transmittance of the light transmission variable structure may impart significant variability of light transmittance to the entire electrochromic device. As a result, the entire electrochromic device may be applied to a window of a building or a car, thereby achieving a light transmission change characteristic capable of producing an energy control effect. In particular, when the thickness of the first chromic layer is within 300 nm to 600 nm, it may be more advantageous for suppressing a change in the transmittance of visible light that may occur when the electrochromic device is subjected to repeated bending, when it is maintained in a bent state for a long period of time, or when electric power is cut off for a long period of time.

In addition, a certain relationship may be satisfied between the thickness of the first chromic layer and the content of the polymer resin. As a specific example, the first chromic layer may have a thickness within ±150 nm, within ±100 nm, or within ±50 nm, based on the thickness calculated in the following equation using the content of the polymer resin as a factor.

Thickness of a first chromic layer (nm)=[content of a polymer resin (part by weight)×75 (nm/part by weight)]+75 (nm)

In the above equation, the content of the polymer resin is in part by weight of the polymer resin based on 100 parts by weight of the reducing chromic material in the first chromic layer.

When the preferred relationship is satisfied between the thickness of the first chromic layer and the content of the polymer resin, it may be more advantageous for suppressing a change in the transmittance of visible light that may occur when the electrochromic device is subjected to repeated bending, when it is maintained in a bent state for a long period of time, or when electric power is cut off for a long period of time.

Second Chromic Layer

The second chromic layer (137) is a layer whose light transmittance changes when a voltage is applied between the first electrode layer (131) and the second electrode layer (139). It is a layer that imparts variability of light transmittance to the electrochromic device.

In another embodiment, the second chromic layer (137) may comprise an oxidizing chromic material and a polymer resin.

The oxidizing chromic material may be one or more selected from the group consisting of nickel oxide (e.g., NiO, $NiO_2$), manganese oxide (e.g., $MnO_2$), cobalt oxide (e.g., $CoO_2$), iridium-magnesium oxide, nickel-magnesium oxide, titanium-vanadium oxide, a Prussian blue-based pigment, and combinations thereof, but it is not limited thereto. The Prussian blue-based pigment is a dark blue pigment and is a compound having a formula of $Fe_4(Fe(CN)_6)_3$.

The polymer resin may be a resin having flexibility and is not limited to a specific type. For example, the polymer resin may be a urethane acrylic-based resin, a silicone-based resin, an acrylic-based resin, an ester-based resin, an epoxy-based resin, a phenolic-based resin, a polyurethane-based resin, a polyimide-based resin, or an ethylene vinyl acetate-based resin, but it is not limited thereto.

In addition, the polymer resin may have a weight average molecular weight of 50 to 10,000 g/mole. Specifically, the weight average molecular weight of the polymer resin may be 100 to 10,000, 200 to 10,000, or 500 to 10,000, but it is not limited thereto.

For example, the second chromic layer (137) may comprise nickel oxide (NiO) and an acrylic-based resin, and the weight average molecular weight of the acrylic-based resin may be 50 to 10,000.

The second chromic layer (137) may comprise an oxidizing chromic material and a polymer resin and may comprise the polymer resin in an amount of 0.1 to 5 parts by weight based on 100 parts by weight of the oxidizing chromic material.

If the second chromic layer comprises the polymer resin in an amount within the above range based on 100 parts by weight of the oxidizing chromic material, the oxidizing chromic material is stably attached to the film surface, which helps to achieve smooth light transmission variable performance.

On the other hand, if the amount of the polymer resin is less than the above range, the oxidizing chromic material is weakly attached to the film surface, so that a problem may arise in that it is detached or scattered even with a slight external impact. Further, the flexibility is also deteriorated, so that color cracks may occur when the device is bent. In addition, if the amount of the polymer resin is greater than the above range, the ionic conductivity is lowered due to the resistance of the polymer resin itself, which may reduce the ionic conductivity performance of the oxidizing chromic material, and the durability at high temperatures may be weakened, resulting in a deterioration in reliability.

The second chromic layer (137) comprises at least one layer and, if necessary, may comprise two or more layers of different materials.

The second chromic layer (137) may have a thickness of 100 nm to 1,000 nm, 100 nm to 800 nm, 100 nm to 600 nm, 100 nm to 500 nm, 100 nm to 400 nm, 200 nm to 800 nm, or 300 nm to 800 nm, but it is not limited thereto.

If the thickness of the second chromic layer (137) satisfies the above range, the device withstands external impacts well, and an appropriate amount of ions may be retained. At the same time, it is advantageous for thinning and securing the flexibility of an electrochromic device and for achieving excellent light transmission change characteristics.

On the other hand, if the thickness of the second chromic layer is less than the above range, the chromic layer is thin, whereby it may be difficult to properly achieve the chromic performance due to a deterioration in ionic conductivity. In addition, if the above range is exceeded, the chromic layer is thick, so that cracks may occur even with slight external impacts, which makes it difficult to achieve a flexible electrochromic device, and the manufacturing cost may be high, which is not economical.

The second chromic layer (137) may have an initial transmittance of 50% or less. Specifically, that the initial transmittance satisfies the above range means that it exhibits a dark blue or pale indigo color when viewed with the naked eye.

In an embodiment, the first chromic layer (133) comprises a reducing chromic material, the second chromic layer (137) comprises an oxidizing chromic material, and the first chromic layer and the second chromic layer may each be formed by a wet coating method.

Specifically, the first chromic layer (133) may be formed by applying a raw material to one side of the first electrode layer (131) by a wet coating method and then drying it. In addition, the second chromic layer (137) may be formed by applying a raw material to one side of the second electrode layer (139) by a wet coating method and then drying it.

The solvent used in the wet coating may be a non-aromatic solvent or an aromatic solvent, specifically, ethanol, acetone, toluene, or the like, but it is not limited thereto.

If the first chromic layer and the second chromic layer are formed by a sputtering coating method, only a very thin coating film of 100 nm or less may be formed due to the nature of the coating method, so that there is a limit to the application to an electrochromic device having both excellent light transmission variable performance and flexibility.

The thickness ratio of the first chromic layer and the second chromic layer may be 50:50 to 80:20, 55:45 to 75:25, or 60:40 to 70:30.

If the thickness ratio of the first chromic layer and the second chromic layer satisfies the above range, there is an effect that the band for color changes between transparency and darkness is wider, and the time for the color changes is shortened. On the other hand, if the above range is not satisfied, the band for color changes between transparency and darkness may be narrow, and the time for the color changes is prolonged, so that the color may change slowly, or the electrochromic device may not work well even if electricity is applied thereto.

Electrolyte Layer

The electrolyte layer (135) is a layer that serves as an ion transport path between the first chromic layer and the second chromic layer. The type of electrolyte used in the electrolyte layer is not particularly limited.

For example, the electrolyte layer may comprise hydrogen ions or Group 1 Element ions. Specifically, the electrolyte layer may comprise a lithium salt compound. The lithium salt compound may be $LiClO_4$, $LiBF_4$, $LiAsF_6$, $LiPF_6$, LiTFSI, LiFSI, or the like, but it is not limited thereto.

In addition, the electrolyte layer may comprise a polymer resin. Specifically, the electrolyte layer may comprise an acrylic-based resin, an epoxy-based resin, a silicone-based resin, a polyimide-based resin, or a polyurethane-based resin, but it is not limited thereto.

Specifically, the acrylic-based resin may be a thermosetting acrylic-based resin, a photocurable acrylic-based resin, or the like. The polyurethane-based resin may be a thermosetting polyurethane-based resin, a photocurable polyurethane-based resin, an aqueous polyurethane-based resin, or the like.

The electrolyte layer may comprise a polymer resin and a lithium salt at a weight ratio of 95:5 to 80:20, 95:5 to 85:15, or 93:7 to 87:3.

The electrolyte layer may have an ionic conductivity of $10^{-3}$ mS/cm or more. Specifically, the ionic conductivity of the electrolyte layer may be $10^{-3}$ mS/cm to 103 mS/cm or $10^{-3}$ mS/cm to $10^2$ mS/cm. If the ionic conductivity of the electrolyte layer is within the above range, the desired light transmission variable performance can be achieved, and it is advantageous from the viewpoint of flexibility and reliability at high temperatures. In addition, the ionic conductivity of the electrolyte layer may be 30 μS/cm or more, 40 μS/cm or more, 50 μS/cm or more, 60 μS/cm or more, 80 μS/cm or more, or 100 μS/cm or more but it is not limited thereto.

The electrolyte layer may have an adhesive strength of 200 g/inch or more. Specifically, the adhesive strength of the electrolyte layer may be 200 g/inch to 900 g/inch, 200 g/inch to 700 g/inch, 300 g/inch to 900 g/inch, or 450 g/inch to 650 g/inch, but it is not limited thereto. If the adhesive strength of the electrolyte layer is within the above range, it adheres well to both substrates so that the performance of the electrochromic device is smoothly exhibited.

The electrolyte layer (135) may be formed by applying a raw material to one side of any one of the first chromic layer (133) or the second chromic layer (137) by a wet coating method and then drying it.

If the electrolyte layer is applied by a wet coating method, the thickness of the coating film can be increased or the thickness of the coating film can be easily controlled, which is advantageous from the viewpoint of enhancing ionic conductivity or chromic speed. On the other hand, if a sputtering coating method, rather than a wet coating method, is used for the electrolyte layer, the coating film may be easily broken or the ionic conductivity may be reduced due to the formation of a thin film.

The electrolyte layer (135) may have a thickness of 30 μm to 200 μm, 50 μm to 200 μm, 50 μm to 150 μm, 70 μm to 130 μm, or 80 μm to 120 μm. If the thickness of the electrolyte layer (135) satisfies the above range, durability is imparted to the electrochromic device. At the same time, the transport path of ions between the first chromic layer and the second chromic layer is secured in an appropriate length, whereby an appropriate speed in the light transmission change performance can be achieved.

Release Film Layer

The electrochromic device (100) according to an embodiment may further comprise a release film layer (160) on the side of the first base layer (110) opposite to the side on which the first barrier layer (120) is laminated (see FIG. 6).

The release film layer (160) may comprise a polyester-based resin comprising polyethylene terephthalate (PET), polyethylene naphthalate (PEN), or polycarbonate (PC).

Specifically, the release film layer may have a thickness of 10 μm to 100 μm, 10 μm to 80 μm, 10 μm to 50 μm, or 12 μm to 50 μm, but it is not limited thereto.

The release film layer has a peel strength of 50 gf/inch or less. Specifically, the peel strength of the release film layer may be 3 gf/inch to 50 gf/inch or 10 gf/inch to 50 gf/inch, but it is not limited thereto.

The release film layer serves to protect the electrochromic device from external moisture or impurities during storage and transport of the electrochromic device. When the electrochromic device is later applied to a transparent window or the like, it may be used after the release film layer is removed, if necessary. The release film layer may particularly prevent a decrease in adhesive strength of the adhesive layer.

An adhesive layer (161) may be formed on one side of the release film layer.

The adhesive layer (161) may comprise an acrylic-based resin, a silicone-based resin, a polyurethane-based resin, an epoxy-based resin, or a polyimide-based resin. Specifically, the adhesive layer may comprise an acrylic resin in which case it is advantageous for enhancing the optical properties and durability.

The adhesive layer may have a blocking rate of UV rays (based on 400 nm) of 95% or more, 97% or more, 98% or more, or 99% or more, but it is not limited thereto.

In addition, the adhesive layer may have an initial adhesive strength of 0.5 N/inch to 8.0 N/inch, 1.0 N/inch to 7.0 N/inch, or 2.0 N/inch to 6.0 N/inch, but it is not limited thereto.

Primer Layer

A primer layer may be laminated on one or both sides of the first base layer (110). Specifically, a first-A primer layer (111) may be laminated on one side of the first base layer (110), and a first-B primer layer (112) may be laminated on the other side (see FIG. 6).

In addition, a primer layer may be laminated on one or both sides of the second base layer (150). Specifically, a second-A primer layer (151) may be laminated on one side of the second base layer (150), and a second-B primer layer (152) may be laminated on the other side (see FIG. 6).

In an embodiment, a primer layer may be interposed between the first barrier layer (120) and the first base layer (110). In addition, a primer layer may be interposed between the second barrier layer (140) and the second base layer (150) (see FIG. 6).

The primer layers (first-A primer layer, first-B primer layer, second-A primer layer, and second-B primer layer) may each comprise an acrylic-based resin, a polyurethane-based resin, a silicone-based resin, or a polyimide-based resin.

The primer layers (first-A primer layer, first-B primer layer, second-A primer layer, and second-B primer layer) may each have a surface tension of 35 dyne/cm$^2$ or less or a surface tension of 30 dyne/cm$^2$ or less.

The primer layers (first-A primer layer, first-B primer layer, second-A primer layer, and second-B primer layer) may each have an adhesive strength of 3.0 gf/inch or more or an adhesive strength of 3.5 gf/inch or more.

The primer layer serves to impart adhesion between the base layer and the barrier layer or to improve the refractive index. In addition, the material forming the respective primer layers, surface tension, peel strength, and the like may be the same or different.

Hard Coat Layer

The electrochromic device (100) according to an embodiment may further comprise a hard coat layer (170) on the side of the second base layer (150) opposite to the side on which the second barrier layer (140) is laminated (see FIG. 6).

The hard coat layer (170) may comprise an acrylic-based resin, a silicone-based resin, a polyurethane-based resin, an epoxy-based resin, or a polyimide-based resin.

The hard coat layer may have a thickness of 1 μm to 10 μm, 2 μm to 8 μm, 2 μm to 6 μm, or 2 μm to 5 μm, but it is not limited thereto.

The hard coat layer may have a pencil hardness of 3H or higher, 4H or higher, or 5H or higher, but it is not limited thereto.

The hard coat layer serves to protect the electrochromic device from external impacts, and it may impart excellent hardness by virtue of its resistance to scratches.

In addition, since the thickness of the hard coat layer satisfies the above range, it is possible to achieve an electrochromic device having flexibility and excellent workability. If the thickness of the hard coat layer exceeds the above range, it is difficult to achieve flexibility. If the thickness of the hard coat layer is less than the above range, it may be vulnerable to external impacts.

In a specific embodiment, the electrochromic device (100) may comprise a release film layer (160); an adhesive layer (161) on the release film layer (160); a first-B primer layer (112) on the adhesive layer (161); a first base layer (110) on the first-B primer layer (112); a first-A primer layer (111) on the first base layer (110); a first barrier layer (120) on the first-A primer layer (111); a light transmission variable structure (130) on the first barrier layer (120); a second barrier layer (140) on the light transmission variable structure (130); a second-A primer layer (151) on the second barrier layer (140); a second base layer (150) on the second-A primer layer (151); a second-B primer layer (152) on the second base layer (150); and a hard coat layer (170) on the second-B primer layer (152).

Effects and Uses

The electrochromic device has a characteristic that the light transmittance is reversibly changed when electric power is applied. Thus, it is possible to selectively control the transmittance of sunlight and the like through a simple operation such as pressing a button, whereby the energy efficiency can be enhanced. In particular, when electric power is applied to the electrochromic device, an electric field is formed between the two electrodes, giving rise to coloration and discoloration, so that the transmittance can be adjusted for each wavelength of sunlight. Thus, an insulation function and a shading function can be advantageously achieved. In addition, the electrochromic device of a large area can be fabricated at a low cost, and its power consumption is low. Thus, it is suitable for use as a smart window, a smart mirror, or other next-generation architectural window materials. In addition, since the electrochromic device has a thin thickness and lightweight and flexible characteristics, it has excellent workability and a low possibility of breakage, it can be stored in a roll form, and it is convenient to transport.

The electrochromic device achieves a light transmission variable function while having flexibility. Thus, it is possible to overcome the limitations that it had to be applied only in a firm structure in the prior art and to secure a desired technical means simply by attaching it to a structure such as a conventional transparent window. For example, the electrochromic device can be applied by simply attaching it to a structure such as a conventional transparent window. Specifically, as shown in FIG. 1, it may be attached to one side of a window. More specifically, FIG. 2 shows a cross-sectional view taken along line A-A' in FIG. 1 and an enlarged view of the part where the electrochromic device has been applied. The electrochromic device (100) may be attached to one side of the window (10), wherein the window (10) may have a flat surface or a curved surface. In addition, the electrochromic device (100) may be attached to the entire side of the window (10) or may be attached to only a part of the window (10). In addition, the electrochromic device (100) may be inserted into the window (10). Specifically, the electrochromic device may be applied through a method of interposing it between glass substrates. More specifically, it can be applied in a way in which two polyvinyl butyral (PVB) films are interposed between laminated glasses of a window, and the electrochromic device is interposed between the two PVB films. It can be stably inserted into the window as it tightly attaches by applying heat.

MODE FOR THE INVENTION

Hereinafter, specific embodiments are described. However, it should be understood that various forms including equivalents or substitutes corresponding to the technical scope of these embodiments can be implemented.

Example A1

Step 1: Preparation of an Acrylic-Based Resin (1-1) A 1-liter, 3-neck round flask equipped with a thermometer, a condenser, a dropping funnel, and a mechanical stirrer was prepared and immersed in a thermostat at 80° C. The flask was charged with 300 g of ethyl acetate and 1.5 g of azobisisobutyronitrile (AIBN) as a radical polymerization initiator, which were rotationally stirred at a speed of 100 revolutions per minute with the mechanical stirrer. Here, the temperature of the condenser was maintained at 10° C.

(1-2) Another flask was charged with 63 parts by weight (189 g) of butyl acrylate, 9 parts by weight (27 g) of methyl methacrylate, 17 parts by weight (51 g) of 2-hydroxyethyl acrylate, and 10 parts by weight (30 g) of para-dodecyl styrene ($C_{20}H_{32}$), which were mixed for 30 minutes with a mechanical stirrer. Thereafter, it was slowly added to the flask of step (1-1) using the dropping funnel.

(1-3) Upon completion of the addition, the temperature of the reactor was maintained at 80° C. While the reaction was carried out, a sample was collected from the reaction mixture, and the weight average molecular weight (MW) of the sample was measured. When the desired weight average molecular weight was reached, it was determined as the reaction completion point, and the reaction mixture was gradually cooled at room temperature to terminate the reaction. The compound (a liquid acrylic-based resin) thus obtained was measured by gel permeation chromatography (GPC). The weight average molecular weight was 70,000 g/mole, and the dispersity was 4.2.

Step 2: Fabrication of an Electrochromic Device

A transparent electrode substrate on which an ITO electrode having a surface resistance of 50 Ω/sq, a barrier layer, a primer layer, and a PET base layer (thickness: 125 μm) had been laminated was disposed on the outermost upper and lower layers.

The coating solution (C) for a reducing chromic layer to be coated on the lower ITO electrode was a tungsten oxide ($WO_3$) paste, which was prepared by mixing the acrylic-based resin ((B), prepared in step 1) dissolved in toluene was mixed with an aqueous ammonium metatungstate solution (A). Here, in the coating solution (C) for a reducing chromic layer, 3 parts by weight of the acrylic resin was employed based on 100 parts by weight of tungsten oxide ($WO_3$).

Thereafter, the coating solution (C) for a reducing chromic layer was applied to the lower ITO electrode through wet coating and dried at 140° C. for 5 minutes to form a reducing chromic layer (thickness: 300 nm). A Prussian blue-based pigment was applied to the upper ITO electrode through wet coating and dried at 140° C. for 5 minutes to form an oxidizing chromic layer (thickness: 400 nm).

A gel electrolyte (ion conductivity of 50 μS/cm or more) was interposed in a thickness of 100 μm between the reducing chromic layer and the oxidizing chromic layer, and they were laminated to prepare an electrochromic device sample (100 mm×100 mm). Subsequently, copper tapes were attached to the sides of the upper and lower transparent electrodes to form a bus bar for power connection.

Examples A2 to A4 and Comparative Examples A1 to A4

An electrochromic device sample was fabricated in the same manner as in Example A1, except that the weight ratio of tungsten oxide and the acrylic resin as the composition of the reducing chromic layer, the thickness of the reducing chromic layer, and the coating method of the reducing chromic layer were changed as shown in Table 1 below.

The following properties of the electrochromic devices fabricated in Examples A1 to A4 and Comparative Examples A1 and A4 were measured and evaluated, and the results are shown in Table 1.

TABLE 1

| | Ex. A1 | Ex. A2 | Ex. A3 | Ex. A4 | C. Ex. A1 | C. Ex. A2 | C. Ex. A3 | C. Ex. A4 |
|---|---|---|---|---|---|---|---|---|
| Coating method of reducing chromic layer | wet | wet | wet | wet | sputtering | wet | wet | wet |
| Thickness of reducing chromic layer (μm) | 300 | 450 | 600 | 600 | 600 | 600 | 600 | 600 |
| Weight of acrylic-based resin in reducing chromic layer (part by weight) | 3 | 5 | 2 | 9 | 0 | 0 | 1 | 13 |

\* The weight of the acrylic-based resin in the reducing chromic layer was in part by weight of the acrylic-based resin based on 100 parts by weight of tungsten oxide ($WO_3$).

Evaluation Example A1: Evaluation of Short-Term Reliability (Evaluation of Radius of Curvature)

In order to deform the fabricated electrochromic device to have a radius of curvature of 17R (17 mm), 30R (30 mm), 70R (70 mm), and 90R (90 mm), it was wound around a cylinder having a desired radius of curvature, and it was then observed with the naked eye to evaluate whether cracks were present and the degree thereof.

If no cracks were present, it was evaluated as "0." If the number of cracks was 1 to less than 5, or if cracks of 2 mm or less were 3 or more, it was evaluated as "fine cracks." If the number of cracks was 5 to 10, or if cracks of 5 mm or more were 5 or more, it was evaluated as "cracks." If the number of cracks exceeded 10, or if cracks of 10 mm or more exceeded 5, it was evaluated as "a lot of cracks." The results are shown in Table 2.

TABLE 2

| | Ex. A1 | Ex. A2 | Ex. A3 | Ex. A4 | C. Ex. A1 | C. Ex. A2 | C. Ex. A3 | C. Ex. A4 |
|---|---|---|---|---|---|---|---|---|
| Radius of curvature of 90R (90 mm) | ○ | ○ | ○ | ○ | ○ | ○ | ○ | ○ |
| Radius of curvature of 70R (70 mm) | ○ | ○ | ○ | ○ | fine cracks | ○ | ○ | ○ |
| Radius of curvature of 30R (30 mm) | ○ | ○ | ○ | ○ | cracks | fine cracks | ○ | ○ |
| Radius of curvature of 17R (17 mm) | ○ | ○ | ○ | ○ | a lot of cracks | a lot of cracks | cracks | ○ |

Evaluation Example A2: Evaluation of Memory Effect

In order to deform the electrochromic device to have a radius of curvature of 17R (17 mm), it was wound around a cylinder having a radius of curvature of 17R (17 mm), and the initial transmittance ($TTd_0$) was then measured in the maximum decolored state. Thereafter, the electric power was turned off, and the transmittances ($TTd_{12}$, $TTd_{24}$) were measured after 12 hours and 24 hours passed, respectively, while the radius of curvature of 17R (17 mm) was maintained.

In addition, in order to deform the electrochromic device to have a radius of curvature of 17R (17 mm), it was wound around a cylinder having a radius of curvature of 17R (17 mm), and the initial transmittance ($TTc_0$) was then measured in the maximum colored state. Thereafter, the electric power was turned off, and the transmittances ($TTc_{12}$, $TTc_{24}$) were measured after 12 hours and 24 hours passed, respectively, while the radius of curvature of 17R (17 mm) was maintained.

When the transmittance was measured, the electrochromic device was unbent to its original state and measured using Ultraviolet spectrum of JASCO. Specifically, the transmittance was transmittance of visible light and was an average of the values measured at 5 nm intervals in the wavelength range of 380 nm to 780 nm using Ultraviolet spectrum of JASCO.

The maximum decolored state means a state in which a change of less than 1% in the transmittance of visible light for 20 seconds lasts for 1 minute or longer when the decoloration operation is carried out in the electrochromic device. The maximum colored state means a state in which a change of less than 1% in the transmittance of visible light for 20 seconds lasts for 1 minute or longer when the coloration operation is carried out in the electrochromic device.

In addition, when the radius of curvature of the electrochromic device was 17R (17 mm), it was difficult to measure meaningful transmittance due to cracks in Comparative Examples A1 to A3 which was evaluated as cracks or a lot of cracks.

The results measured by the above method are shown in Table 3.

Evaluation Example A3: Evaluation of Long-Term Reliability

In order to deform the electrochromic device to have a radius of curvature of 17R (17 mm), it was wound around a cylinder having a radius of curvature of 17R (17 mm), and the initial transmittance was then measured in the maximum decolored state and in the maximum colored state.

Thereafter, the electric power was turned off. When 24 hours passed while the radius of curvature of 17R (17 mm) was maintained, the electric power was turned on again, and the decoloration operation and the coloration operation were driven. The transmittance was measured in the maximum decolored state and in the maximum colored state.

The measurement method of transmittance is as described in Evaluation Example 3.

The results measured by the above method are shown in Table 3.

TABLE 3

| | | Ex. A1 | Ex. A2 | Ex. A3 | Ex. A4 | C. Ex. A1 | C. Ex. A2 | C. Ex. A3 | C. Ex. A4 |
|---|---|---|---|---|---|---|---|---|---|
| Evaluation of cracks at a radius of curvature of 17R (17 mm) | | ○ | ○ | ○ | ○ | cracks a lot of | cracks a lot of | cracks | ○ |
| Max. decolored state | Initial transmittance (%) $TTd_0$ | 67.3 | 67.6 | 67.8 | 67.5 | 68.7 | 68.0 | 68.0 | 66.9 |
| | Transmittance (%) after 12 hours $TTd_{12}$ | 67.1 | 67.4 | 67.7 | 67.0 | — | — | 59.0 (non-uniform) | 65.6 |
| | Transmittance (%) after 24 hours $TTd_{24}$ | 66.8 | 67.0 | 67.3 | 66.0 | — | — | — | 63.5 |
| | Change in transmittance (%) after 12 hours $\Delta TTd_{12}$ | 0.2 | 0.2 | 0.1 | 0.5 | — | — | — | 1.3 |
| | Change in transmittance (%) after 24 hours $\Delta TTd_{24}$ | 0.5 | 0.6 | 0.5 | 1.5 | — | — | — | 3.4 |
| Max. colored state | Initial transmittance (%) $TTc_0$ | 12.8 | 13.0 | 13.2 | 13.5 | 12.7 | 12.8 | 13.0 | 14.1 |
| | Transmittance (%) after 12 hours $TTc_{12}$ | 13.1 | 13.4 | 13.4 | 14.0 | — | — | 19.0 (non-uniform) | 15.0 |
| | Transmittance (%) after 24 hours $TTc_{24}$ | 13.4 | 13.7 | 13.6 | 14.6 | — | — | — | 16.4 |
| | Change in transmittance (%) after 12 hours $\Delta TTc_{12}$ | 0.3 | 0.4 | 0.2 | 0.5 | — | — | — | 0.9 |
| | Change in transmittance (%) after 24 hours $\Delta TTc_{24}$ | 0.6 | 0.7 | 0.4 | 1.1 | — | — | — | 2.3 |
| Initial chromic range at a radius of curvature of 17R (17 mm) | | 67.3-12.8 | 67.6-13.0 | 67.8-13.2 | 67.5-13.5 | 68.7-12.7 | 68.0-12.8 | 68.0-13.0 | 66.9-14.1 |
| $\Delta TTdc_0$ (%) | | 54.5 | 54.6 | 54.6 | 54.0 | 56.0 | 55.2 | 55.0 | 52.8 |
| Chromic range (%) in decoloration and coloration operations after 24 hours at a radius of curvature of 17R (17 mm) | | 67.3-12.8 | 67.5-13.0 | 67.8-13.2 | 67.3-13.6 | a lot of cracks | a lot of cracks | cracks (non-uniform) | 66.7-14.3 |
| $\Delta TTdc_{24}$ (%) | | 54.5 | 54.5 | 54.6 | 53.7 | — | — | — | 52.4 |
| TTRdc (%) | | 100 | 99.82 | 100 | 99.44 | — | — | — | 99.24 |

As can be seen from Table 2 above, even when the electrochromic devices of Examples A1 to A4 were deformed to have a radius of curvature of 17R (17 mm), no cracks occurred. In contrast, in Comparative Example A1, cracks occurred when the radius of curvature was 70R (70 mm) or less. In Comparative Example A2, cracks occurred when the radius of curvature was 30R (30 mm) or less. In Comparative Example A3, cracks occurred when the radius of curvature was 17R (17 mm) or less. As a result, it was confirmed that the electrochromic device according to the embodiment could be deformed to have a small radius of curvature.

As can be seen from Table 2 above, in Examples A1 to A4, the $\Delta TTd_{12}$ value was 1% or less, and the $\Delta TTd_{24}$ value was 3% or less, which indicates that the transmittance was maintained at a certain level even after the electric power was turned off in the maximum decolored state. As such, in Examples A1 to A4, the $\Delta TTc_{12}$ value was 0.8% or less, and the $\Delta TTc_{24}$ value was 2% or less, which indicates that the transmittance was maintained at a certain level even after the electric power was turned off in the maximum colored state.

In contrast, in Comparative Examples A1 to A3, cracks or a lot of cracks occurred when the radius of curvature was 17R (17 mm), making it difficult to measure meaningful transmittance. In Comparative Examples A4, the $\Delta TTd_{12}$ value, $\Delta TTd_{24}$ value, $\Delta TTc_{12}$ value, and $\Delta TTc_{24}$ value exceeded the above ranges, which indicates that the memory effect was deteriorated.

That the memory effect is deteriorated as in Comparative Example A4 means that the transmittance of the electrochromic device would not maintain the desired level when the electric power is turned off. Thus, it is not suitable for commercialization as a smart window.

In addition, the TTRdc values in Examples A1 to A4 were as high as 90% or more, specifically, 99.3% or more, which indicates that the device could be deformed to have a small radius of curvature and that it is possible to achieve an excellent light transmission variable function even after the deformed state lasts several hours.

As a result, the electrochromic device according to an embodiment can be applied to curved windows without deteriorating performance, it can be stored in a roll form, thereby reducing logistics costs, and it is convenient to store and transport.

Example B1

Step 1: Preparation of an Acrylic-Based Resin

A 1-liter, 3-neck round flask (flask A) equipped with a thermometer, a condenser, a dropping funnel, and a mechanical stirrer was prepared. It was charged with 300 g of ethyl acetate and 1.5 g of azobisisobutyronitrile (AIBN) as a radical polymerization initiator, which were rotationally stirred at a speed of 100 revolutions per minute with the mechanical stirrer in a thermostat at 80° C. Here, the temperature of the condenser was maintained at 10° C. Another flask (flask B) was charged with 189 g of butyl acrylate, 27 g of methyl methacrylate, 51 g of 2-hydroxyethyl acrylate, and 30 g of para-dodecyl styrene, which were mixed for 30 minutes with a mechanical stirrer. It was slowly added to the previous flask (flask A) using the dropping funnel. The reaction was carried out while the temperature was maintained at 80° C. When the desired weight average molecular weight was reached, the reaction mixture was gradually cooled at room temperature to terminate the reaction, thereby obtaining an acrylic-based resin. It was measured by gel permeation chromatography (GPC). The weight average molecular weight was 70,000 g/mole, and the dispersity was 4.2.

Step 2: Fabrication of an Electrochromic Device

Two transparent electrode substrates in which a primer layer, a barrier layer, and an ITO electrode (with a surface resistance of 50 Ω/sq) had been formed on a PET base layer (thickness: 125 μm) were prepared and used as upper and lower plates.

The acrylic-based resin (prepared in step 1) was dissolved in toluene, which was mixed with an aqueous ammonium metatungstate solution (A) to prepare a tungsten oxide ($WO_3$) paste. Here, 3 parts by weight of the acrylic resin was employed based on 100 parts by weight of tungsten oxide ($WO_3$). The tungsten oxide paste was applied to the lower ITO electrode through wet coating and dried at 140° C. for 5 minutes to form a reducing chromic layer (thickness: 300 nm).

In addition, a Prussian blue-based pigment was applied to the upper ITO electrode through wet coating and dried at 140° C. for 5 minutes to form an oxidizing chromic layer (thickness: 400 nm).

A gel electrolyte (ion conductivity of 50 μS/cm or more) was interposed in a thickness of 100 μm between the reducing chromic layer and the oxidizing chromic layer, and they were laminated to prepare an electrochromic device (300 mm in length×200 mm in width). Subsequently, copper tapes were attached to the sides of the ITO electrode layer of the upper and lower plates to form a bus bar for power connection.

Examples B2 to B9 and Comparative Examples B1 and B2

An electrochromic device was fabricated in the same manner as in Example B1, except that the weight ratio of tungsten oxide and the acrylic resin as the composition of the reducing chromic layer and/or the thickness of the reducing chromic layer were changed as shown in Tables 5 to 8 below.

Test Example

The following tests were carried out on the electrochromic devices prepared in the Examples and Comparative Examples.

A. Specimen Size 300 mm in length×200 mm in width×350 μm in thickness

B. Test Method

Bending test: The specimen was bent such that the distance between both ends of the specimen in length was 25% of the length and then restored to its original shape (repeated 7-10 times per minute).

Retention test: The bent state in which the distance between both ends of the specimen in length was 25% of the length was maintained for a certain period of time.

Memory test: Electric power was applied to the specimen to achieve the maximum decolored state, the electric power was then cut off and maintained for a certain period of time.

C. Transmittance Measurement

Electric power was applied to the specimen to achieve the maximum decolored state or maximum colored state, the average transmittance of visible light was measured at four points (P2) distanced (a) by 30 mm from the edge of the corner of the specimen and at the center point (P1) of the specimen, respectively. The average transmittance of visible light is an average of transmittance values measured at 5 nm intervals in the wavelength range of 380 to 780 nm.

D. Measurement Data

TT_0: Initial (before the test) transmittance measured in the maximum decolored state TT_0': Initial (before the test) transmittance measured in the maximum colored state TT_30: Transmittance measured in the maximum decolored state after the bending test had been repeated 30 times TT_30': Transmittance measured in the maximum colored state after the bending test had been repeated 30 times TT_50: Transmittance measured in the maximum decolored state after the bending test had been repeated 50 times TT_50': Transmittance measured in the maximum colored state after the bending test had been repeated 50 times TT_100: Transmittance measured in the maximum decolored state after the retention test had been carried out for 100 hours TT_100': Transmittance measured in the maximum colored state after the retention test had been carried out for 100 hours TT_100H_B30: Transmittance measured in the maximum decolored state after the retention test had been carried out for 100 hours and the bending test had been repeated times TT_100H_B30': Transmittance measured in the maximum colored state after the retention test had been carried out for 100 hours and the bending test had been repeated times TT_B30_M12H: Transmittance measured in the maximum decolored state after the bending test had been repeated 30 times and the memory test had been carried out for 12 hours TT_B30_M12H': Transmittance measured in the maximum colored state after the bending test had been repeated 30 times and the memory test had been carried out for 12 hours The measured data are summarized in Tables 5 to 8 in the form of Table 4 below.

TABLE 4

| Test item | | Initial (before the test) | 30 times Bending | 50 times Bending | Bent 100 hours | Bent 100 H + bending 30 times | Bending 30 times + 12 H retention after colored |
|---|---|---|---|---|---|---|---|
| Transmittance (%) | Decolored | TT_0 | TT_B30 | TT_B50 | TT_100 H | TT_100 H_B30 | TT_B30_M12 H |
| | Colored | TT_0' | TT_B30' | TT_B50' | TT_100 H' | TT_100 H_B30' | TT_B30_M12 H' |

TABLE 5

| | Thickness of reducing chromic layer (nm) | Additive content* (part by weight) | Test item | | Initial (before the test) | Bending 30 times | Bending 50 times | Bent 100 H | Bent 100 H + bending 30 times | Bending 30 times + retention 12 H after colored |
|---|---|---|---|---|---|---|---|---|---|---|
| Ex. B1 | 300 | 3 | Transmittance* (%) | Decolored | 67.3 | 67.2 | 67.0 | 67.2 | 67.0 | 66.9 |
| | | | | Colored | 13.0 | 12.9 | 13.1 | 12.9 | 13.2 | — |
| | | | Δ transmittance (%) | | 54.3 | 54.3 | 53.9 | 54.3 | 53.8 | — |
| Ex. B2 | 450 | 5 | Transmittance* (%) | Decolored | 67.5 | 67.4 | 67.3 | 67.3 | 67.2 | 67.0 |
| | | | | Colored | 13.1 | 13.0 | 13.2 | 13.0 | 13.2 | — |
| | | | Δ transmittance (%) | | 54.4 | 54.4 | 54.1 | 54.3 | 54.0 | — |
| Ex. B3 | 600 | 7 | Transmittance* (%) | Decolored | 67.6 | 67.6 | 67.5 | 67.6 | 67.3 | 67.1 |
| | | | | Colored | 13.3 | 13.2 | 13.4 | 13.3 | 13.7 | — |
| | | | Δ transmittance (%) | | 54.3 | 54.4 | 54.1 | 54.3 | 53.6 | — |

*Additive content (part by weight): content relative to 100 parts by weight of tungsten oxide in the reducing chromic layer

*Transmittance: an average of values measured at 5 nm intervals in the wavelength range of 380 to 780 nm

TABLE 6

| | Thickness of reducing chromic layer (nm) | Additive content* (part by weight) | Test item | | Initial (before the test) | Bending 30 times | Bending 50 times | Bent 100 H | Bent 100 H + bending 30 times | Bending 30 times + retention 12 H after colored |
|---|---|---|---|---|---|---|---|---|---|---|
| Ex. B4 | 600 | 1 | Transmittance* (%) | Decolored | 68.2 | 68.1 | 67.7 | — | — | 65.5 |
| | | | | Colored | 13.2 | 13.3 | 14.0 | — | — | — |
| | | | Δ transmittance (%) | | 55.0 | 54.3 | 53.7 | — | — | — |
| Ex. B5 | 600 | 3 | Transmittance* (%) | Decolored | 68.0 | 68.0 | 67.8 | — | — | 67.0 |
| | | | | Colored | 13.3 | 13.4 | 13.5 | — | — | — |
| | | | Δ transmittance (%) | | 54.7 | 54.6 | 54.3 | — | — | — |
| Ex. B6 | 600 | 9 | Transmittance* (%) | Decolored | 67.5 | 67.3 | 67.1 | — | — | 64.0 |
| | | | | Colored | 13.5 | 13.6 | 13.8 | — | — | — |
| | | | Δ transmittance (%) | | 54.0 | 53.7 | 53.3 | — | — | — |

*Additive content (part by weight): content relative to 100 parts by weight of tungsten oxide in the reducing chromic layer

*Transmittance: an average of values measured at 5 nm intervals in the wavelength range of 380 to 780 nm

TABLE 7

| | Thickness of reducing chromic layer (nm) | Additive content* (part by weight) | Test item | | Initial (before the test) | Bending 30 times | Bending 50 times | Bent 100 H | Bent 100 H + bending 30 times | Bending 30 times + retention 12 H after colored |
|---|---|---|---|---|---|---|---|---|---|---|
| Ex. B7 | 300 | 1 | Transmittance* (%) | Decolored | 67.5 | 67.3 | 67.7 | — | — | 67.1 |
| | | | | Colored | 13.0 | 13.3 | 14.0 | — | — | — |
| | | | Δ transmittance (%) | | Δ54.5 | Δ54.0 | Δ53.7 | — | — | — |
| Ex. B8 | 300 | 7 | Transmittance* (%) | Decolored | 67.0 | 66.8 | 67.8 | — | — | 66.5 |
| | | | | Colored | 13.3 | 13.5 | 13.5 | — | — | — |
| | | | Δ transmittance (%) | | Δ53.7 | Δ53.3 | Δ54.3 | — | — | — |
| Ex. B9 | 300 | 9 | Transmittance* (%) | Decolored | 64.0 | 63.8 | 63.8 | — | — | 59.5 |
| | | | | Colored | 14.8 | 15.0 | 15.1 | — | — | — |
| | | | Δ transmittance (%) | | Δ49.2 | Δ48.8 | Δ48.7 | — | — | — |

*Additive content (part by weight): content relative to 100 parts by weight of tungsten oxide in the reducing chromic layer
*Transmittance: an average of values measured at 5 nm intervals in the wavelength range of 380 to 780 nm

TABLE 8

| | Thickness of reducing chromic layer (nm) | Additive content* (part by weight) | Test item | | Initial (before the test) | Bending 30 times | Bending 50 times | Bent 100 H | Bent 100 H + bending 30 times | Bending 30 times + retention 12 H after colored |
|---|---|---|---|---|---|---|---|---|---|---|
| C. Ex. B1 | 600 | 0 | Transmittance* (%) | Decolored | 68.3 | 68.2 | 66.5 | — | — | — |
| | | | | Colored | 13.2 | 13.3 | 15.0 | — | — | — |
| | | | Δ transmittance (%) | | Δ55.1 | Δ54.9 | Δ51.5 | — | — | — |
| C. Ex. B2 | 900 | 0 | Transmittance* (%) | Decolored | 69.0 | 57.0 | Not working (entire cracks) | — | — | — |
| | | | | Colored | 12.5 | 21.0 | | — | — | — |
| | | | Δ transmittance (%) | | Δ56.5 | Δ36.0 | | — | — | — |

*Additive content (part by weight): content relative to 100 parts by weight of tungsten oxide in the reducing chromic layer
*Transmittance: an average of values measured at 5 nm intervals in the wavelength range of 380 to 780 nm E. Calculation of Equations Using the Measured Data The following equations were calculated using the measured data and summarized in Table 9 below.

(i) Change in transmittance before and after the bending test repeated 30 times $\Delta TT\_B30 (\%) = |TT\_B30 - TT\_0|$ (ii) Change in transmittance operation band before and after the bending test repeated 30 times $\Delta TT\_B30\_d (\%) = ||TT\_B30 - TT\_B30'| - |TT\_0 - TT\_0'||$ (iii) Change in transmittance before and after the bending test repeated 50 times $\Delta TT\_B50 (\%) = |TT\_B50 - TT\_0|$ (iv) Change in transmittance before and after the retention test for 100 hours in a bent state $\Delta TT\_100H (\%) = |TT\_100H - TT\_0|$ (iv) Change in transmittance before and after the retention for 100 hours in a bent state and the bending test repeated 30 times $\Delta TT\_100H\_B30 (\%) = |TT\_100H\_B30 - TT\_0|$ (vi) Change in transmittance after the bending test repeated 30 times, application of electric to achieve the maximum decolored state, cutting off the electric power, and retention for 12 hours $\Delta TT\_B30\_M12H (\%) = |TT\_B30\_M12H - TT\_0|$

TABLE 9

| Unit: % | ΔTT_B30 (i) | ΔTT_B30_d (ii) | ΔTT_B50 (iii) | ΔTT_100 H (iv) | ΔTT_100 H_B30 (v) | ΔTT_B30_M12 H (vi) |
|---|---|---|---|---|---|---|
| Ex. B1 | 0.1 | 0 | 0.3 | 0.1 | 0.3 | 0.4 |
| Ex. B2 | 0.1 | 0 | 0.2 | 0.2 | 0.3 | 0.5 |
| Ex. B3 | 0 | 0.1 | 0.1 | 0 | 0.3 | 0.5 |
| Ex. B4 | 0.1 | 0.7 | 0.5 | — | — | 2.7 |
| Ex. B5 | 0 | 0.1 | 0.2 | — | — | 1.0 |
| Ex. B6 | 0.2 | 0.3 | 0.4 | — | — | 3.5 |
| Ex. B7 | 0.2 | 0.5 | 0.2 | — | — | 0.4 |
| Ex. B8 | 0.2 | 0.4 | 0.8 | — | — | 0.5 |
| Ex. B9 | 0.2 | 0.4 | 0.2 | — | — | 4.5 |
| C. Ex. B1 | 1.8 | 3.6 | — | — | — | — |
| C. Ex. B2 | cracks | cracks | — | — | — | — |

F. Analysis of Results

As can be seen from the above tables, in the electrochromic device of Comparative Example B1, fine cracks occurred after the bending test was repeated 30 times, and the change in transmittance relative to the initial state exceeded 1%. In addition, in the electrochromic device of Comparative Example B2, a lot of cracks occurred after the bending test was repeated 10 times, resulting in a significant decrease in transmittance. During the bending test repeated 30 times, a lot of cracks occurred on the entire surface, whereby its operation was impossible.

In contrast, in the electrochromic devices of Examples B1 to B9, the change in transmittance after the bending test was repeated 30 times was within 1% relative to the initial state.

In particular, in the electrochromic device of Examples B1 to B3, the change in transmittance after the repeated bending test, the retention test, or the retention with electric power off was within 1% relative to the initial state.

Meanwhile, referring to Examples B4 to B6, the decoloration maintenance (memory) function and bending characteristics were affected by the additive content at a certain level of thickness. Specifically, in Example B4, fine cracks occurred after the bending test was repeated 50 times. In Examples B4 and B6, the transmittance was slightly lowered after the bending test was repeated 30 times, and application of electric power to achieve the maximum decolored state, cutting off electric power, and retention for 12 hours.

In addition, referring to Examples B7 to B9, when the thickness of tungsten oxide was thin, the transmittance operating band and memory function were affected by the additive content.

The invention claimed is:

1. An electrochromic device, which comprises a light transmission variable structure interposed between a first base layer and a second base layer,
   wherein the light transmission variable structure comprises a first chromic layer and a second chromic layer,
   wherein the first chromic layer comprises a reducing chromic material and a polymer resin,
   wherein the polymer resin is one or more selected from the group consisting of silicone-based resins, acrylic-based resins, phenolic-based resins, polyurethane-based resins, polyimide-based resins, or ethylene vinyl acetate-based resins,
   wherein the value of $\Delta TTd_{24}$ as defined in the following Equation (1) is 3% or less:

$$\Delta TTd_{24}(\%) = |TTd_{24} - TTd_0| \qquad (1)$$

wherein, in Equation (1), $TTd_0$ is the average transmittance (%) of visible light in the maximum decolored state when electric power is applied after the electrochromic device is deformed to have a radius of curvature of 17 mm,
   wherein $TTd_{24}$ is the average transmittance (%) of visible light measured after $TTd_0$ is measured, the electric power is turned off, and the electrochromic device deformed to have a radius of curvature of 17 mm is maintained for 24 hours, and
   wherein the electrochromic device has no cracks when it is deformed to have a radius of curvature of 70 mm.

2. The electrochromic device of claim 1, wherein the value of $\Delta TTc_{24}$ as defined in the following Equation (2) is 2% or less:

$$\Delta TTc_{24}(\%) = |TTc_{24} - TTc_0| \qquad (2)$$

in Equation (2), $TTc_0$ is the average transmittance (%) of visible light in the maximum colored state when electric power is applied after the electrochromic device is deformed to have a radius of curvature of 17 mm, and
   $TTc_{24}$ is the average transmittance (%) of visible light measured after $TTc_0$ is measured, the electric power is turned off, and the electrochromic device deformed to have a radius of curvature of 17 mm is maintained for 24 hours.

3. The electrochromic device of claim 1, wherein the value of TTRdc as defined in the following Equation (3) is 90% or more:

$$TTRdc\ (\%) = (\Delta TTdc_{24}/\Delta TTdc_0) \times 100 \qquad (3)$$

in Equation (3), $\Delta TTdc_0$ is the difference (%) between the average transmittance of visible light in the maximum decolored state and the average transmittance of visible light in the maximum colored state as measured after the electrochromic device is deformed to have a radius of curvature of 17 mm, and when electric power is applied, and
   $\Delta TTdc_{24}$ is the difference (%) between the average transmittance of visible light in the maximum decolored state and the average transmittance of visible light in the maximum colored state as measured after $TTdc_0$ is measured, the electric power is turned off, and the electrochromic device deformed to have a radius of curvature of 17 mm is maintained for 24 hours, and when electric power is applied.

4. The electrochromic device of claim 1, wherein the first chromic layer comprises 2 to 12 parts by weight of the polymer resin relative to 100 parts by weight of the reducing chromic material.

5. The electrochromic device of claim 1, wherein the second chromic layer comprises an oxidizing chromic material, and the first chromic layer and the second chromic layer are each formed by a wet coating method.

6. The electrochromic device of claim 1, wherein the first chromic layer has a thickness of 100 nm to 1,000 nm, and the second chromic layer has a thickness of 100 nm to 1,000 nm.

7. The electrochromic device of claim 1, wherein the first base layer and the second base layer each comprise one or more selected from the group consisting of polyethylene terephthalate (PET), polyethylene naphthalate (PEN), polycarbonate (PC), polyimide (PI), polycyclohexylenedimethylene terephthalate (PCT), polyethersulfone (PES), nylon, polymethyl methacrylate (PMMA), and cycloolefin polymer (COP).

8. The electrochromic device of claim 1, wherein the first base layer has a thickness of 10 μm to 300 μm and the second base layer has a thickness of 10 μm to 300 μm.

* * * * *